United States Patent
Clarke et al.

(10) Patent No.: US 8,319,937 B2
(45) Date of Patent: Nov. 27, 2012

(54) ALIGNMENT OF LIQUID CRYSTALLINE MATERIALS TO SURFACE RELIEF DIFFRACTIVE STRUCTURES

(75) Inventors: Roger Clarke, Cambridge (GB); Joshua N. Haddock, Roanoke, VA (US); William Kokonaski, Gig Harbor, WA (US)

(73) Assignee: PixelOptics, Inc., Roanoke, VA (US)

( * ) Notice: Subject to any disclaimer, the term of this patent is extended or adjusted under 35 U.S.C. 154(b) by 1233 days.

(21) Appl. No.: 12/101,264

(22) Filed: Apr. 11, 2008

(65) Prior Publication Data

US 2009/0096981 A1      Apr. 16, 2009

Related U.S. Application Data

(60) Provisional application No. 60/979,228, filed on Oct. 11, 2007, provisional application No. 61/039,155, filed on Mar. 25, 2008.

(51) Int. Cl.
*G02F 1/13*       (2006.01)
*G02F 1/1335*   (2006.01)
*G02B 27/44*    (2006.01)

(52) U.S. Cl. ........... 349/201; 349/13; 349/200; 359/566

(58) Field of Classification Search .............. 349/13, 349/200–201, 123–126; 359/161, 164, 566, 359/571
See application file for complete search history.

(56) References Cited

U.S. PATENT DOCUMENTS

| | | | |
|---|---|---|---|
| 5,056,908 A * | 10/1991 | Cohen | 351/161 |
| 6,517,203 B1 * | 2/2003 | Blum et al. | 351/168 |
| 6,871,951 B2 | 3/2005 | Blum et al. | |
| 2003/0210377 A1 | 11/2003 | Blum et al. | |
| 2005/0185135 A1 | 8/2005 | Blum et al. | |
| 2007/0279562 A1 | 12/2007 | Rho et al. | |
| 2008/0002150 A1 | 1/2008 | Blum et al. | |
| 2008/0180630 A1 | 7/2008 | Clarke | |
| 2010/0002190 A1 * | 1/2010 | Clarke et al. | 351/168 |

OTHER PUBLICATIONS

International Search Report of Application No. PCT/US08/60002 mailed on Jul. 18, 2008.
Fowler et al., "Liquid crystal lens review", Ophthal. Physiol. Opt., 1990, vol. 10, pp. 186-194.

* cited by examiner

*Primary Examiner* — Dung T. Nguyen
(74) *Attorney, Agent, or Firm* — Kilpatrick Townsend & Stockton LLP

(57) ABSTRACT

An alignment layer may align molecules of a liquid crystalline material to a surface of a substrate having a diffractive optical power region using a nonlinear alignment. The alignment layer may align the molecules of the liquid crystalline material in one of a tangential alignment, a piecewise tangential alignment, a perpendicular alignment, a piecewise perpendicular alignment, a continuous intra-zone alignment, or a piecewise continuous intra-zone alignment. The nonlinear alignment may result in optimal or near optimal alignment of the liquid crystalline material thereby resulting in improved optics and fewer vision compromises.

18 Claims, 23 Drawing Sheets

ALIGNMENT OF LIQUID CRYSTALLINE MATERIALS TO SURFACE RELIEF DIFFRACTIVE STRUCTURES

CROSS REFERENCE TO RELATED APPLICATIONS

This application claims priority from and incorporates by reference in their entirety the following provisional applications:
- U.S. Ser. No. 60/979,228 filed on 11 Oct. 2007 and entitled "Rotationally Symmetric Alignment of Cholesteric Liquid Crystal for Electro-Active Diffractive Lenses"; and
- U.S. Ser. No. 61/039,155 filed on 25 Mar. 2008 and entitled "Alignment of Liquid Crystalline Materials to Surface Relief Diffractive Structures".

BACKGROUND OF THE INVENTION

1. Field of the Invention

The present invention relates to an alignment layer for aligning molecules of a liquid crystalline material to a surface of a substrate. More specifically, the present invention relates to an alignment layer for aligning molecules of a liquid crystalline material to a surface of a substrate having a diffractive optical power region using a homogeneous alignment that is one of a tangential alignment, a piecewise tangential alignment, a perpendicular alignment, a piecewise perpendicular alignment, an oblique alignment, a piecewise oblique alignment, a continuous intra-zone alignment, a piecewise continuous intra-zone alignment, or a combination thereof.

2. Description of the Related Art

When using a layer of liquid crystalline material, it is necessary to align (i.e., anchor) molecules of the liquid crystalline material at the surface of a substrate. Most liquid crystalline materials are optically uniaxial and possess a single axis of symmetry with respect to their optical properties. This axis is known as the "director". The liquid crystal director is a unit vector describing the average direction of orientation for liquid crystal molecules over a given region of the liquid crystal bulk. When the liquid crystalline material is unaligned, the orientation of the director varies throughout the bulk of the layer of material. Alignment of the molecules of the liquid crystalline material at the surface of the substrate generates a preferred alignment of the liquid crystalline material throughout the bulk of the layer such that the director is made to point, on average, in a single direction, called the alignment direction. When aligned, on average, in a single direction, optical waves traveling through the liquid crystalline material experience a known set of optical properties (e.g., index of refraction, phase retardation, or transmissivity). The orientation of the liquid crystal molecules may then be altered from the preferred alignment direction in a predetermined manner (e.g., by means of applied electrical energy) to alter the optical properties that optical waves traveling through the liquid crystalline material experience.

While surface relief structures such as linear gratings and obliquely vacuum evaporated refractory oxides such as SiO have been used in the past to align liquid crystalline materials, their use in commercial applications has been mostly supplanted by layers of engineered alignment materials (i.e., alignment layers). An alignment layer may comprise a thin film of an organic, optically transparent material that is processed from solution. The alignment layer may induce preferential alignment of the liquid crystalline material. These engineered alignment materials may be used to create alignment layers that align molecules of the liquid crystalline material in an alignment direction that is mostly parallel to the substrate surface. Such an alignment is known as a homogeneous alignment. Alternatively, these materials may be used to create alignment layers that align molecules of the liquid crystalline material in an alignment direction that is mostly perpendicular to the substrate surface. Such an alignment is known as a homeotropic alignment.

Homogeneous alignment is typically achieved by mechanically rubbing or brushing a thin film of alignment material in a single direction using a pad or roller coated with a soft cloth such as, for example, synthetic velvet. By way of example only, the polyimide material SE-130 from Nissan Chemical Industries Ltd. is designed for this purpose. Homeotropic alignment is typically achieved with an alignment material that alters the surface energy of the substrate and causes one end of the molecules of liquid crystalline material, either the hydrophilic end or the hydrophobic end, to be strongly attracted or strongly repelled, thereby causing the molecules to stand on end. By way of example only, the polyimide material SE-1211 from Nissan Chemical Industries Ltd. is designed for this purpose. Such techniques are well known in the liquid crystal art.

More recently, photosensitive alignment materials have been developed for aligning molecules of liquid crystalline material. When exposed to linearly polarized UV radiation, these materials align the molecules in a direction that is either parallel or perpendicular to the direction of polarization of the UV radiation. By way of example only, the material ROP-103 from Rolic Technologies Ltd. is designed for this purpose.

However, the techniques for preferentially aligning molecules of liquid crystalline material with alignment materials have been optimized for flat-panel information displays built from mostly smooth, planar substrates where uniform, linear alignment over the surface of the substrates is required. Therefore, there is the need in the art for techniques for preferentially aligning molecules of liquid crystalline material with alignment materials in devices that comprise a substrate having non-planar fine features such as surface relief diffractive structures.

SUMMARY OF THE INVENTION

In a first embodiment of the present invention an electro-active lens may include an ophthalmic lens. The electro-active lens may further include an electro-active element in optical communication with the ophthalmic lens. The electro-active element may include a first substrate having a diffractive optical power region. The electro-active element may further include a first alignment layer disposed on a surface of the substrate having a homogeneous alignment that is selected from the group consisting of: a tangential alignment, a piecewise tangential alignment, a perpendicular alignment, a piecewise perpendicular alignment, an oblique alignment, a piecewise oblique alignment, a continuous intra-zone alignment, a piecewise continuous intra-zone alignment, and any combination thereof.

In a second embodiment of the present invention an electro-active element may include a first substrate having a diffractive optical power region. The electro-active element may further include a first alignment layer disposed on a surface of the substrate having a homogeneous alignment that is selected from the group consisting of: a tangential alignment, a piecewise tangential alignment, a perpendicular alignment, a piecewise perpendicular alignment, an oblique alignment, a piecewise oblique alignment, a continuous intra-zone alignment, a piecewise continuous intra-zone alignment, and any combination thereof.

BRIEF DESCRIPTION OF THE DRAWINGS

Embodiments of the present invention will be understood and appreciated more fully from the following detailed description in conjunction with the figures, which are not to scale, in which like reference numerals indicate corresponding, analogous or similar elements, and in which.

DESCRIPTION OF THE PREFERRED EMBODIMENT

Figure 1:
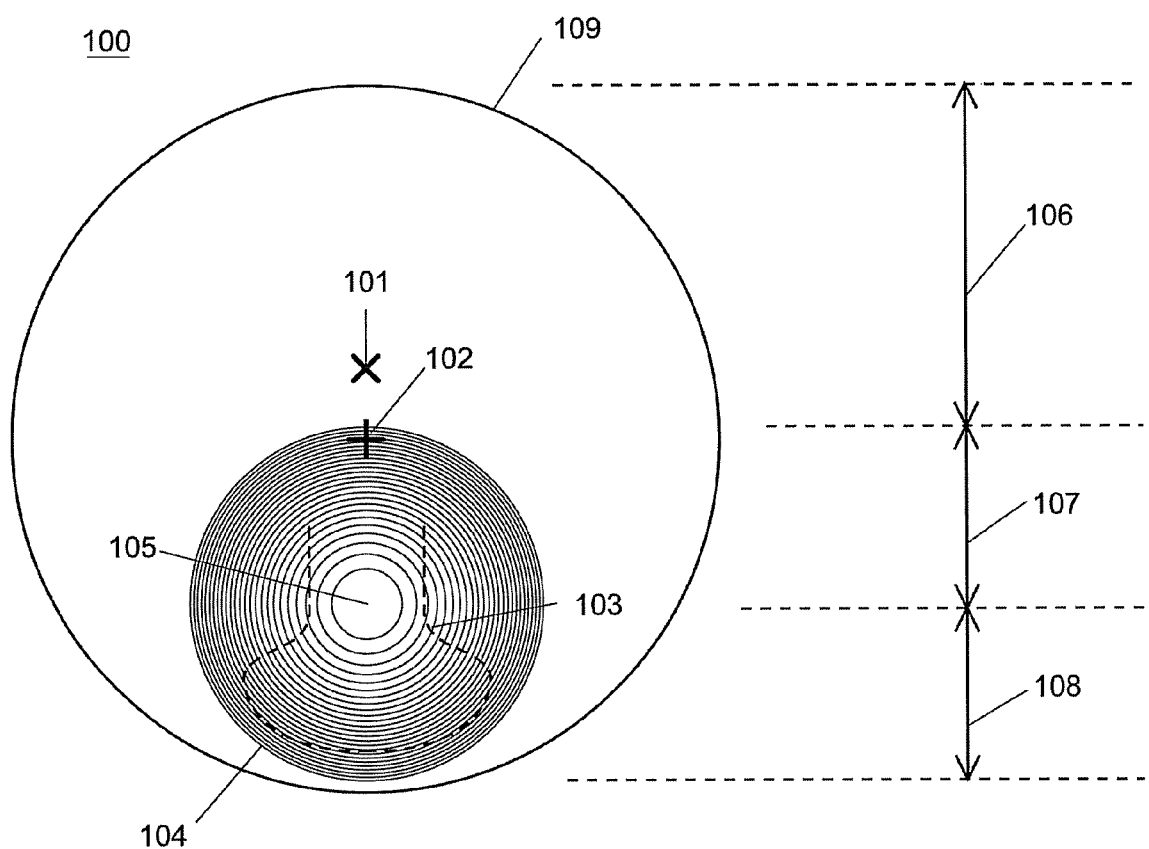
FIG. 1 shows an electro-active lens according to an embodiment of the present invention.

An electro-active element is a device with an alterable optical property. The alterable optical property may be, for example, optical power, focal length, diffraction efficiency, depth of field, transmissivity, tinting, or a combination thereof. An electro-active element may be constructed from two substrates. The two substrates may have an electro-active material disposed therebetween. The electro-active material may have an optical property that is alterable with the application of electrical energy. The alterable optical property may be, for example, index of refraction, opacity, or a combination thereof. Changes in the electro-active material's optical property may cause changes in the electro-active element's optical property. The substrates may be shaped and sized to ensure that the electro-active material is constrained by the substrates and cannot leak out. One or more electrodes may be disposed on each surface of the substrates that faces the electro-active material. The electro-active element may include a controller operably connected to a power supply. The controller may be operably connected to the electrodes by electrical connections for applying one or more voltages to each of the electrodes. When electrical energy is applied to the electro-active material by way of the electrodes, an optical property of the electro-active material may be altered thereby causing the electro-active element's optical property to be altered. For example, the electro-active material's index of refraction may be altered thereby causing the optical power of the electro-active element to be altered.

The electro-active element may be embedded within or attached to a surface of an ophthalmic lens to form an electro-active lens. The ophthalmic lens may be a lens or an optical substrate. A "lens" is any device or portion of a device that causes light to converge or diverge (i.e., a lens may be capable of focusing light). A lens may be refractive or diffractive, or a combination thereof. A lens may be concave, convex, or planar on one or both surfaces. A lens may be spherical, cylindrical, prismatic, or a combination thereof. A lens may be made of optical glass, plastic, thermoplastic resins, thermoset resins, a composite of glass and resin, or a composite of different optical grade resins or plastics. It should be pointed out that within the optical industry a device can be referred to as a lens even if it has zero optical power (known as plano or no optical power). However, in this case, the lens is usually referred to as a "plano lens". The lens may be a single focus lens or a multifocal lens such as a Progressive Addition Lens or a bifocal or trifocal lens.

A lens may be either conventional or non-conventional. A conventional lens corrects for conventional errors of the eye including lower order aberrations such as myopia, hyperopia, presbyopia, and regular astigmatism. A non-conventional lens corrects for non-conventional errors of the eye including higher order aberrations that can be caused by ocular layer irregularities or abnormalities. The term "refractive error" may refer to either conventional or non-conventional errors of the eye.

An optical substrate may be a lens blank. A lens blank is a device made of optical material that may be shaped into a lens. A lens blank may be "finished", meaning that the lens blank has both of its external surfaces shaped into refractive external surfaces. A finished lens blank has an optical power which may be any optical power including zero or plano optical power. A lens blank may be "semi-finished", meaning that the lens blank has been shaped to have only one finished refractive external surface. A lens blank may be "unfinished", meaning that neither external surface of the lens blank has been shaped into a refractive surface. An unfinished surface of an unfinished or semi-finished lens blank may be finished by means of a fabrication process known as free-forming or by more traditional surfacing and polishing. A finished lens blank has not had its peripheral edge shaped, edged, or modified to fit into an eyeglass frame.

The electro-active element may be located in the entire viewing area of the electro-active lens or in just a portion thereof. The electro-active element may be located near the top, middle or bottom portion of the lens. The electro-active element may be spaced from the peripheral edge of the optical substrate or lens in order to allow the electro-active lens to be edged for spectacle frames. It should be noted that the electro-active element may be capable of focusing light on its own and does not need to be combined with an optical substrate or lens.

The electro-active element may be capable of switching between a first optical power and a second optical power. The electro-active element may have the first optical power in a deactivated state and may have the second optical power in an activated state. The electro-active element may be in a deactivated state when one or more voltages applied to the electrodes of the electro-active element are below a first predetermined threshold. The electro-active element may be in an activated state when one or more voltages applied to the electrodes of the electro-active element are above a second predetermined threshold. Alternatively, the electro-active element may be capable of "tuning" its optical power such that the electro-active element is capable of providing a continuous, or substantially continuous, optical power change between the first optical power and the second optical power. In such an embodiment, the electro-active element may have the first optical power in a deactivated state and may have an optical power between the first optical power and the second optical power in an activated state.

Electro-active lenses may be used to correct for conventional or non-conventional errors of the eye. The correction may be created by the electro-active element, by the optical substrate or the lens, or by a combination of the two.

Existent conventional refractive, multifocal ophthalmic lenses which are used for the correction of presbyopia stand to benefit a great deal from the inclusion of diffractive optical technology. Presbyopia is the loss of accommodation of the crystalline lens of the human eye that often accompanies aging. In a presbyopic individual, this loss of accommodation first results in an inability to focus on near distance objects and later results in an inability to focus on intermediate distance objects. Progressive Addition Lenses (PALs) are a type of multifocal lens which comprises a gradient of continuously increasing positive dioptric optical power from the far distance zone of the lens to the near distance zone in the lower portion of the lens. While PALs are now widely accepted and in vogue within the United States and throughout the world as a correction for presbyopia, they also have serious vision compromises. These compromises include, but are not limited to, unwanted astigmatism, distortion, and swim, especially for near distance vision correction prescriptions greater than +2.00 D.

When considering the near distance optical power needs of a presbyopic individual, the amount of near distance optical power required is inversely proportional to the amount of accommodative amplitude (near distance focusing ability) the individual has left in his or her eyes. Generally, as an individual ages the amount of accommodative amplitude decreases. Accommodative amplitude may also decrease for various health reasons. Therefore, as one ages and becomes more presbyopic, the optical power needed to correct one's ability to focus at a near distance and an intermediate distance becomes stronger in terms of the needed dioptric optical power. The near and intermediate distance optical power is usually stated in terms of an "add power", "additive optical power", or "near vision correction". An add power is the amount of positive optical power over the far distance vision correction. Add power usually refers to the optical power added to the far distance vision correction to achieve proper near distance vision correction. For example, if an individual requires −1.00 D of optical power correction for far distance viewing and +1.0 D of add power for near distance viewing such an individual's spectacle lenses will measure 0.00 D of optical power in the near distance zone.

By comparing the different near distance add power needs of two individuals, it is possible to directly compare each individual's near point focusing needs. By way of example only, an individual 45 years old may need +1.00 D of near distance add power to see clearly at a near point distance, while an individual 80 years old may need +2.75 D to +3.50 D of near distance add power to see clearly at the same near point distance. Because the degree of vision compromises in PALs increases with dioptric add power, a more highly presbyopic individual will be subject to greater vision compromises. In the example above, the individual who is 45 years of age will have a lower level of distortion and wider intermediate distance and near distance vision zones associated with his or her lenses than the individual who is 80 years of age. As is readily apparent, this is the complete opposite of what is needed given the quality of life issues associated with being elderly, such as frailty or loss of dexterity. Prescription multifocal lenses that add compromises to vision function and inhibit safety are in sharp contrast to lenses that make lives easier, safer, and less complex.

By way of example only, a conventional PAL with a +1.00 D near distance add power may have approximately 1.00 D or less of unwanted astigmatism. However, a conventional PAL with a +2.50 D near distance add power may have approximately 2.75 D or more of unwanted astigmatism while a conventional PAL with a +3.25 D near distance add power may have approximately 3.75 D or more of unwanted astigmatism. Thus, as a PAL's near distance add power increases (for example, a +2.50 D PAL compared to a +1.00 D PAL), the unwanted astigmatism found within the PAL increases at a greater than linear rate.

As the inventors have previously disclosed in U.S. patent application Ser. No. 11/808,759 filed 17 Jun. 2007 and entitled "Static Progressive Surface Region in Optical Communication with a Dynamic Optic", which is incorporated herein by reference in its entirety, this problem may be overcome by using a progressive addition region in optical communication with an electro-active element. The electro-active element may generate optical power diffractively. One of the benefits of such an approach is that a lens may be formed that has a low add power progressive addition region and an electro-active element, wherein the progressive addition region generates a portion of the lens's total add power and the electro-active element generates the balance of the lens's total add power. Because unwanted astigmatism increases at a greater than linear rate as a function of a progressive addition region's add power, the lens's unwanted astigmatism may be significantly reduced because the progressive addition region does not provide all of the lens's add power.

FIG. 1 shows an electro-active lens 100 according to an embodiment of the present invention. The electro-active lens may have a far distance zone 106, an intermediate distance zone 107, and a near distance zone 108. The electro-active lens may comprise an ophthalmic lens 109. The ophthalmic lens may be a lens blank that may be unfinished, semi-finished, or fully-finished. The electro-active lens may have a fitting point 101 and a geometric center 102. The fitting point is a reference point on a lens that represents the approximate location of a wearer's pupil when looking straight ahead through the lens once the lens is mounted in an eyeglass frame and positioned on the wearer's face. The electro-active lens may have a progressive optical power region 103 in optical communication with at least a portion of an electro-active element 104. The progressive optical power region may have a first add power. When deactivated, the electro-active element may have substantially no optical power. When activated, the electro-active element may have a second add power. Thus, the portion/portions of the lens where the progressive addition region and the electro-active element are in optical communication may have a total add power equal to the first add power when the electro-active element is deactivated and may have a total add power equal to the first add power plus the second add power when the electro-active element is activated. However, because the electro-active element has substantially no unwanted astigmatism, the lens may have a total unwanted astigmatism less than or equal to the magnitude of the first add power regardless of whether or not the electro-active element is activated.

Figure 2:
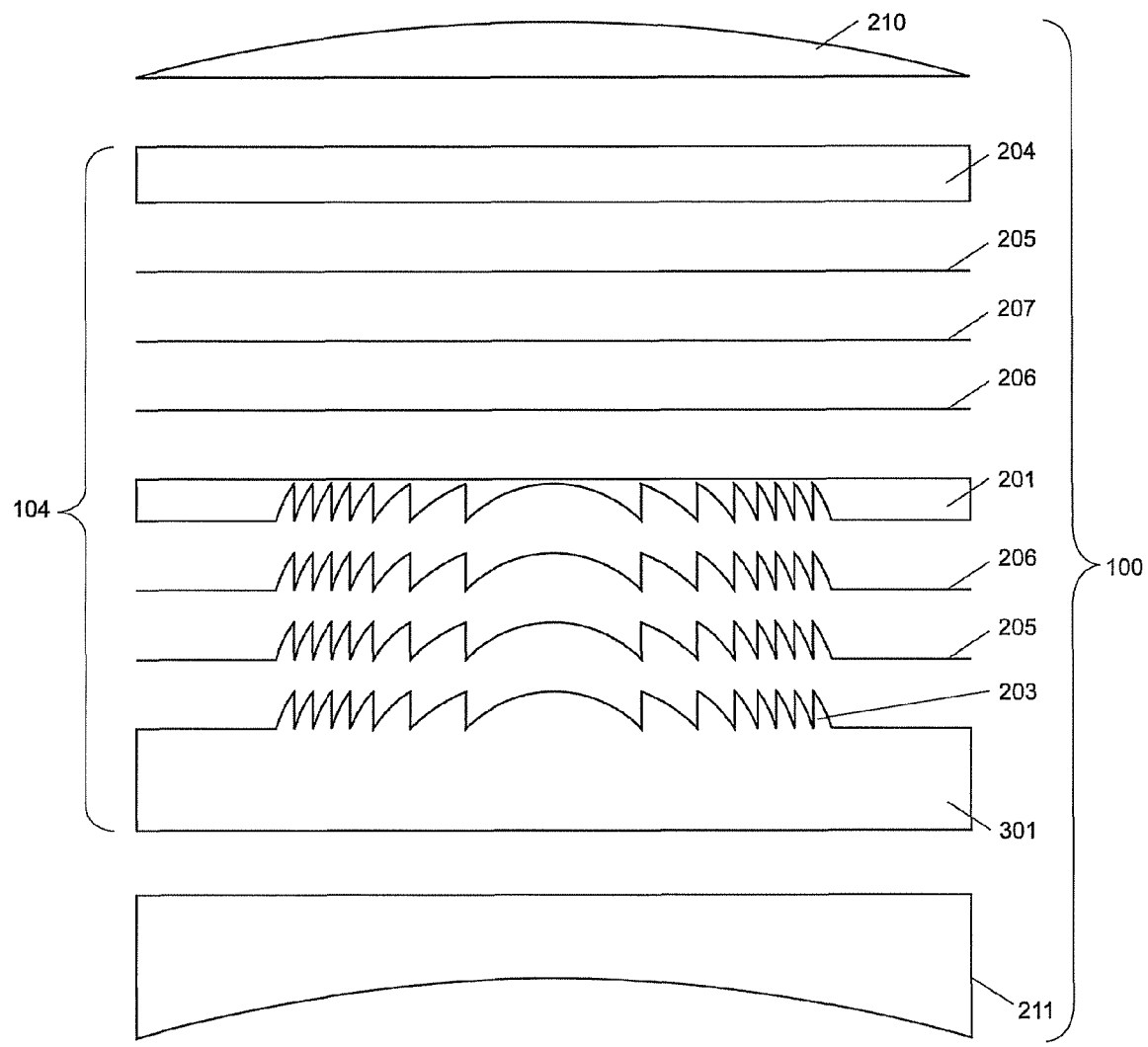
FIG. 2 shows an exploded cross-sectional view of an electro-active lens according to an embodiment of the present invention.

FIG. 2 shows an exploded cross-sectional view of an electro-active lens 100 according to an embodiment of the present invention. The electro-active lens may have an electro-active element 104 which is adhesively attached to a first optical element 211 and a second optical element 210. Either or both optical elements may have external surfaces which may be unfinished, semi-finished, or finished. The optical design of one or both of the optical surfaces may be optimized to allow certain features of the optical design (e.g., a progressive addition region) to be in optical communication with the electro-active element. The electro-active element may have a first substrate 301 and a second substrate 204. Alternatively, one or both of the optical elements may be used as a substrate. The first substrate may have a diffractive optical power region 203 having surface relief diffractive structures. As can be seen in FIG. 2, a surface relief diffractive structure may have a depth equal to the distance from the structure's crest to the structure's trough. The surface relief diffractive structures may be continuous circles or ellipses. The second substrate may be substantially flat. Alternatively, the second substrate may also have a surface relief diffractive structure. As another alternative, the first substrate may be substantially flat and the second substrate may have a surface relief diffractive structure. A layer of liquid crystalline material 201 may be constrained by the first substrate and the second substrate. The liquid crystalline material may be a nematic liquid crystal, a cholesteric liquid crystal, a smectic liquid crystal, a polymer dispersed liquid crystal, or a polymer stabilized liquid crystal. Both the first substrate and the second substrate may be coated with a transparent electrode 205 for applying an electric field to the layer of liquid crystalline material. An alignment layer 206 may be disposed on top of electrode 205. The electrodes may have electrical contacts (not shown) to allow electrical connection to a controller. The alignment layers may preferentially align the layer of liquid crystal in a predetermined alignment direction relative to the substrates. To avoid electrical conduction (i.e., electrical shorting) between the two transparent electrodes, one or more electrical insulating layers 207 may be disposed between the electrodes. It should be understood that the electro-active element may be curved in some embodiments of the invention. A more detailed description of such embodiments may be found in U.S. patent application Ser. No. 12/018,048 filed 22 Jan. 2008 and entitled "Cholesteric Liquid Crystalline Material", which is incorporated herein by reference in its entirety.

Figure 3A:
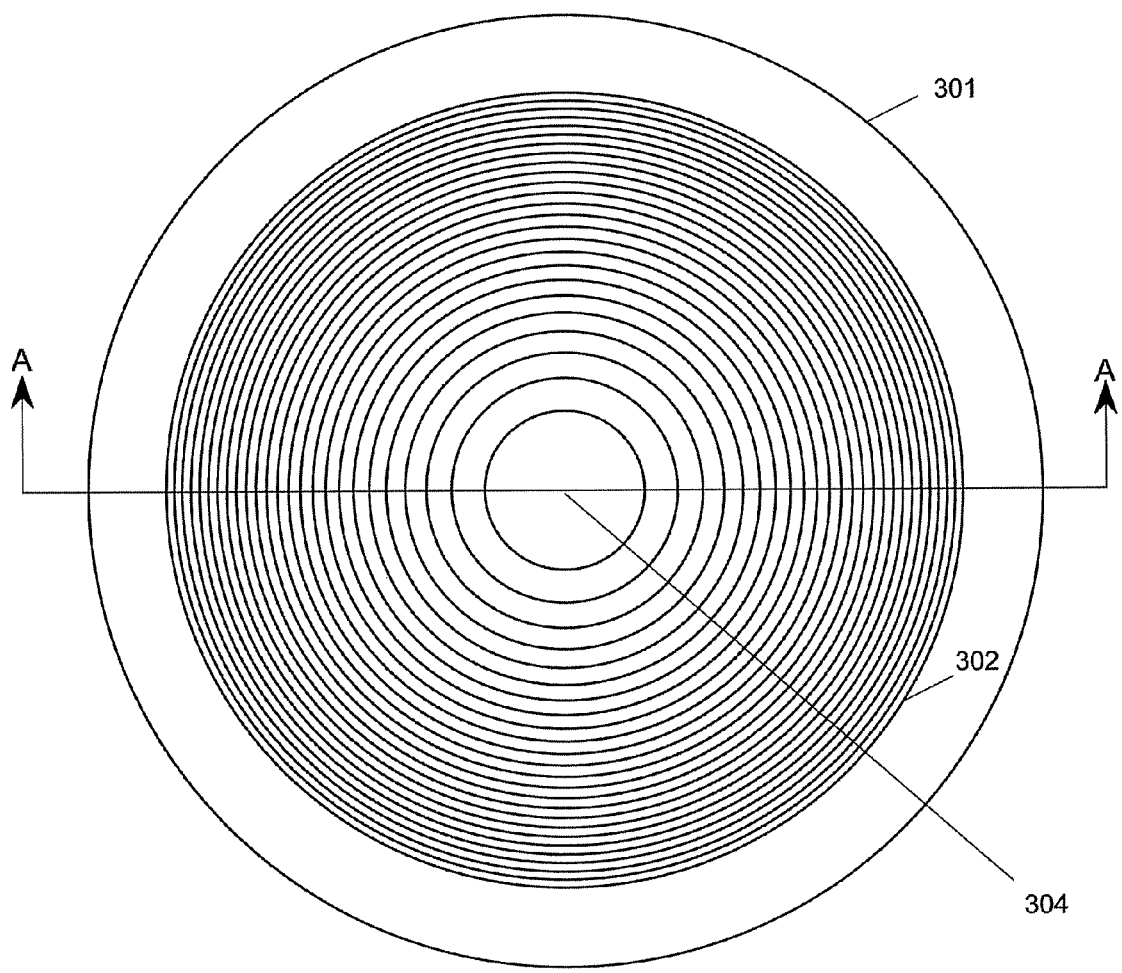
FIG. 3A shows a top view of a substrate according to an embodiment of the present invention.
Figure 3B:
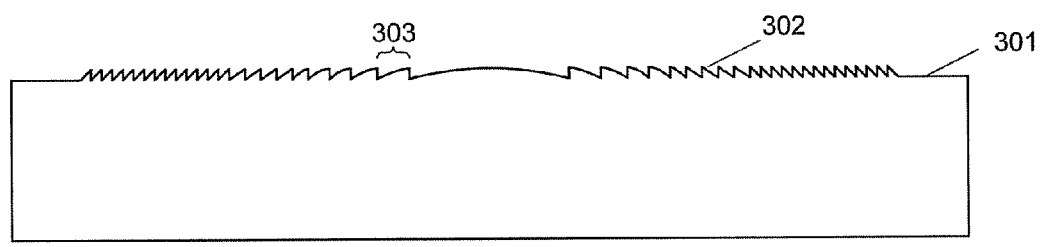
FIG. 3B shows a cross-sectional side view of the substrate of FIG. 3A taken along axis AA according to an embodiment of the present invention.

FIG. 3A shows a top view of a substrate 301 according to an embodiment of the present invention. The substrate may have a diffractive optical power region 302 comprising surface relief diffractive structures which are rotationally symmetric about a geometric center of the substrate 304. While the diffractive optical power region 302 in FIG. 3A is shown as circular, it is understood that embodiments of the present invention include surface relief diffractive structures of any shape such as elliptical. FIG. 3B shows a cross-sectional side view of the substrate of FIG. 3A taken along axis AA according to an embodiment of the present invention. FIG. 3B shows the topographical profile of the diffractive optical power region, which is made up of individual diffractive structures 303. The diffractive structures 303 may also be referred to as Fresnel zones or diffractive zones.

When diffractive structures are depicted from the top as in FIG. 3A, the diffractive structures are drawn herein as circles or ellipses. These circles or ellipses represent a tracing, for example, of the crest of each diffractive structure. However, it is to be understood that a diffractive structure is a three-dimensional structure. In a top view drawing of diffractive structures the space shown between the lines depicting adjacent inner and outer diffractive structures is actually occupied by the inner diffractive structure as its height decreases from its crest to its trough, by way of example only.

Figure 4A:
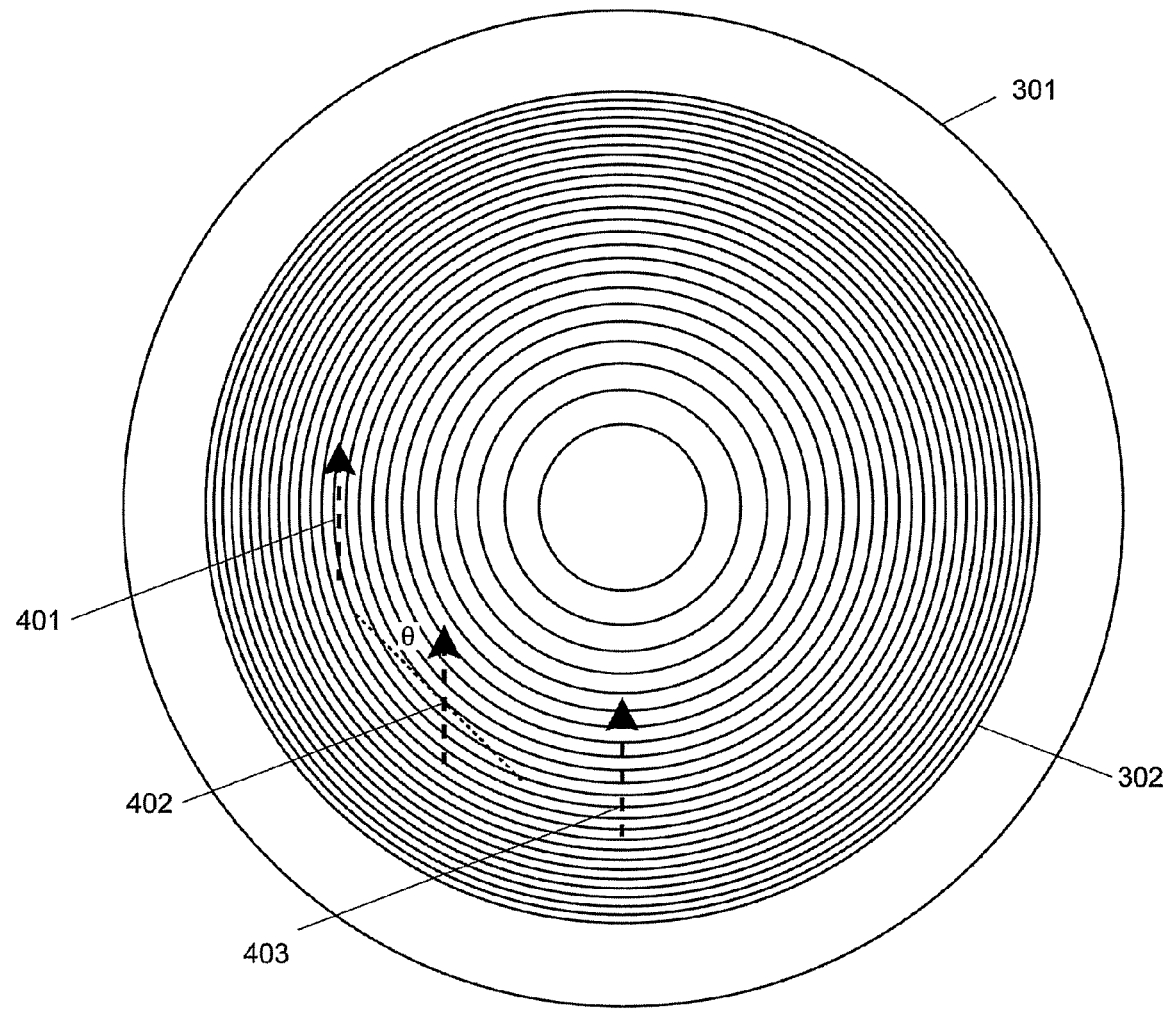
FIGS. 4A-4E show top views of a substrate having a diffractive optical power region with an alignment layer disposed thereon that has been homogeneously aligned according to embodiments of the present invention.

FIG. 4A shows a top view of a substrate 301 having a diffractive optical power region 302 with an alignment layer disposed thereon that has been homogeneously linearly aligned according to an embodiment of the present invention. In conventional liquid crystal devices with homogeneous alignment, alignment at the substrate surface will typically be, by way of example only, linear and uniform over the surface of the substrate as indicated by arrows 401, 402, and 403, which show the direction of alignment. An electro-active element may comprise homogeneously aligned substrate 301 as one of its substrates. Due to the homogenous alignment, liquid crystalline material may not optimally align with the surface relief diffractive structures at all points within the diffractive optical power region. For example, alignment of the liquid crystalline material may be ideal when the alignment direction is tangential 401, oblique 402, or perpendicular 403 to the surface relief diffractive structures, but may not be ideal for all three. Therefore, the optical performance of the electro-active element may be ideal in areas where the alignment is tangential 401, perpendicular 403, or oblique 402 (i.e., at a predetermined angle) to the surface relief diffractive structures, but may not be ideal for all three. Optical performance of the electro-active element may be judged by an optical parameter such as diffraction efficiency or a material parameter such as liquid crystal switching speed.

In embodiments of the present invention, the term "tangential" to a diffractive structure shall mean tangential to the crest and/or trough of the diffractive structure as shown by direction 401 in FIG. 4A, by way of example only. The term "perpendicular" to a diffractive structure shall mean perpendicular to the crest and/or trough of the diffractive structure as shown by direction 403 in FIG. 4A, by way of example only. The term "oblique" to a diffractive structure shall mean oriented at a predetermined angle, θ, with respect to the tangent to the crest and/or trough of the diffractive structure as shown by direction 402 in FIG. 4A, by way of example only. It is to be understood that for any given point on a diffractive structure, the terms "tangential", "perpendicular", and "oblique" to the diffractive structure mean tangential, perpendicular, and oblique, respectively, to the crest and/or trough of the diffractive structure that is nearest to the point.

In embodiments of the present invention, an alignment layer may have a homogeneous alignment used to align molecules of the liquid crystalline material. The homogeneous alignment may be one of a tangential alignment, a piecewise tangential alignment, a perpendicular alignment, a piecewise perpendicular alignment, an oblique alignment, a piecewise oblique alignment, a continuous intra-zone alignment, a piecewise continuous intra-zone alignment, or a combination thereof.

Figure 4B:
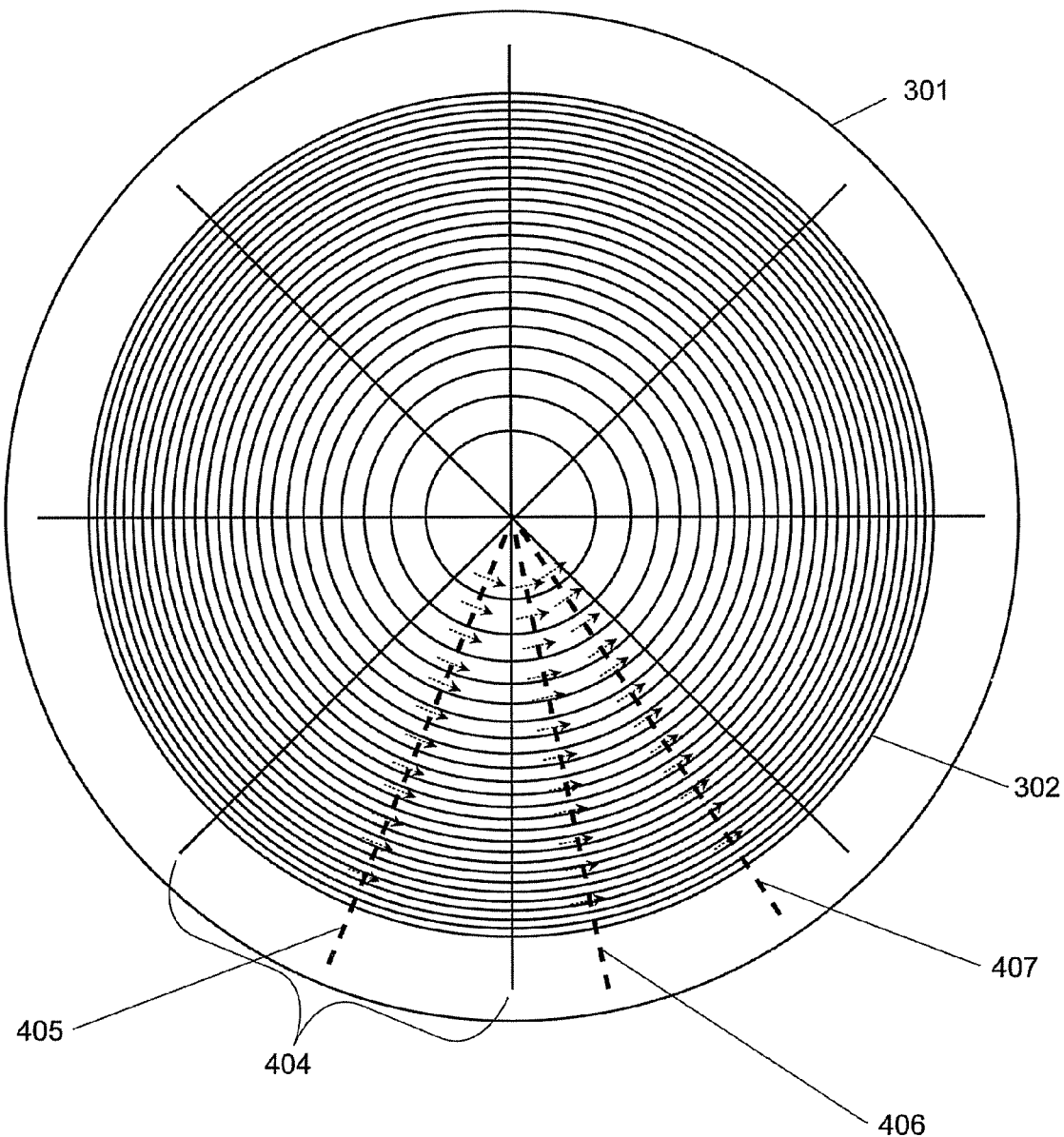

In a tangential alignment of the liquid crystalline material, the alignment direction is substantially tangent to the diffractive structures for every point along the diffractive structures. In a piecewise tangential alignment, a diffractive optical power region may be divided into sections or wedges 404 as shown in FIG. 4B, wherein each section comprises 1 degree to 90 degrees of arc, for example. Within each section 404, the alignment direction may be substantially tangent to the diffractive structures along a single locus of points 405 or along multiple loci of points 406 and 407, by way of example only. Although only two loci of points are shown, it is to be understood that any number of loci of points may be used.

Figure 4C:
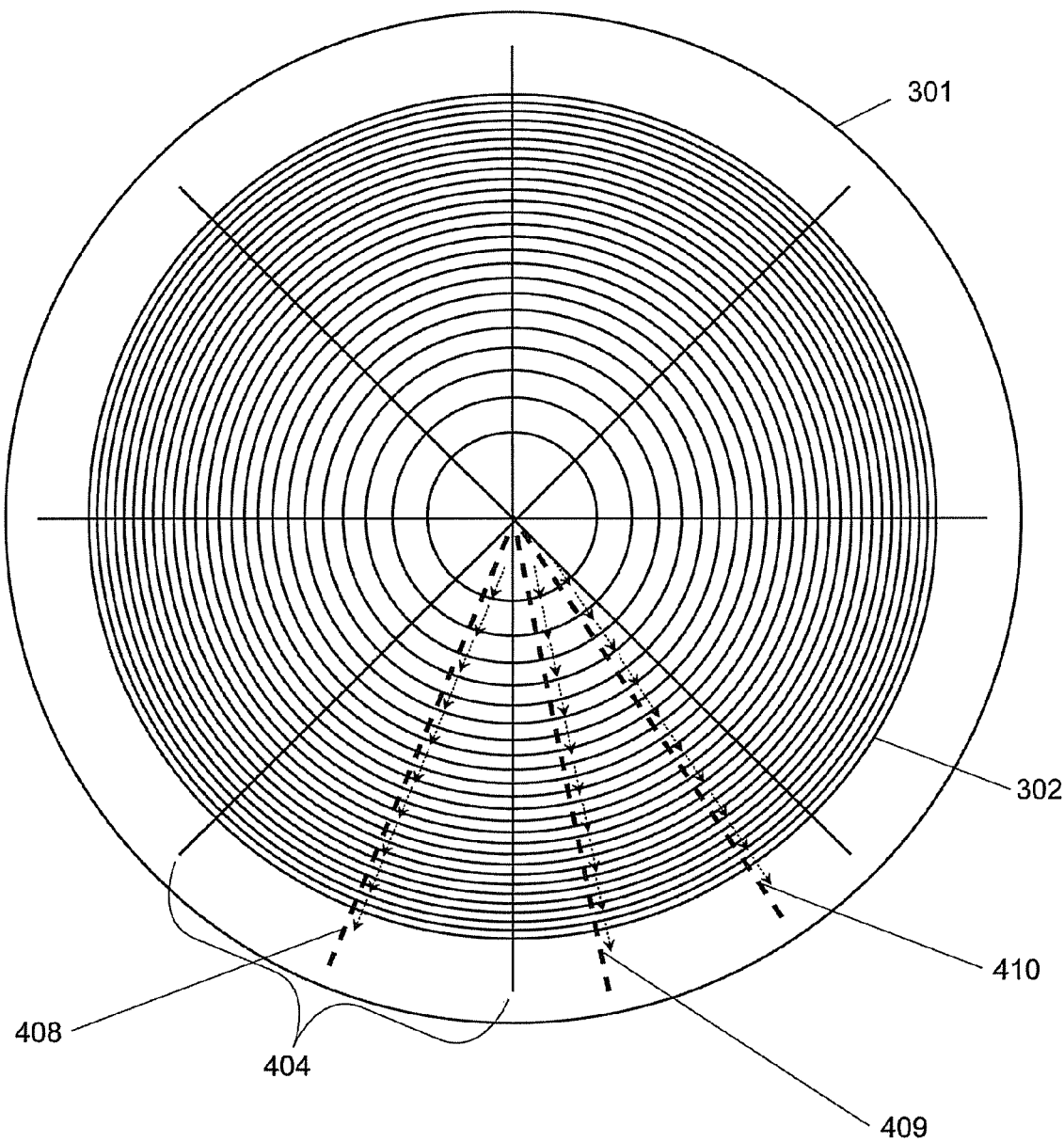

In a perpendicular alignment of the liquid crystalline material, the alignment direction is substantially perpendicular to the diffractive structures for every point along the diffractive structures. In a piecewise perpendicular alignment, a diffractive optical power region may be divided into sections or wedges 404 as shown in FIG. 4C, wherein each section comprises 1 degree to 90 degrees of arc, for example. Within each section 404, the alignment direction may be substantially perpendicular to the diffractive structures along a single locus of points 408 or along multiple loci of points 409 and 410, by way of example only. Although only two loci of points are shown, it is to be understood that any number of loci of points may be used.

Figure 4D:
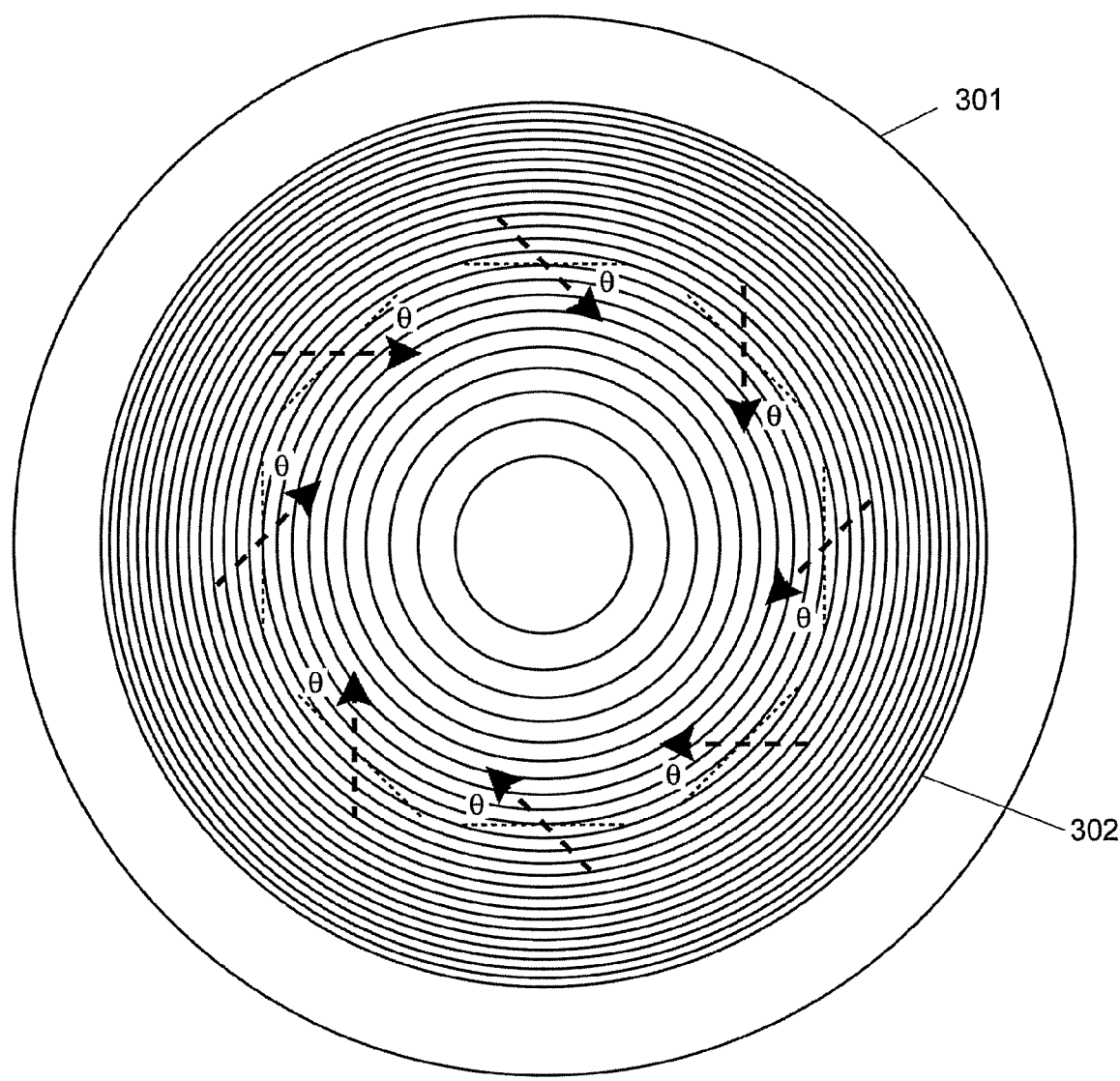
Figure 4E:
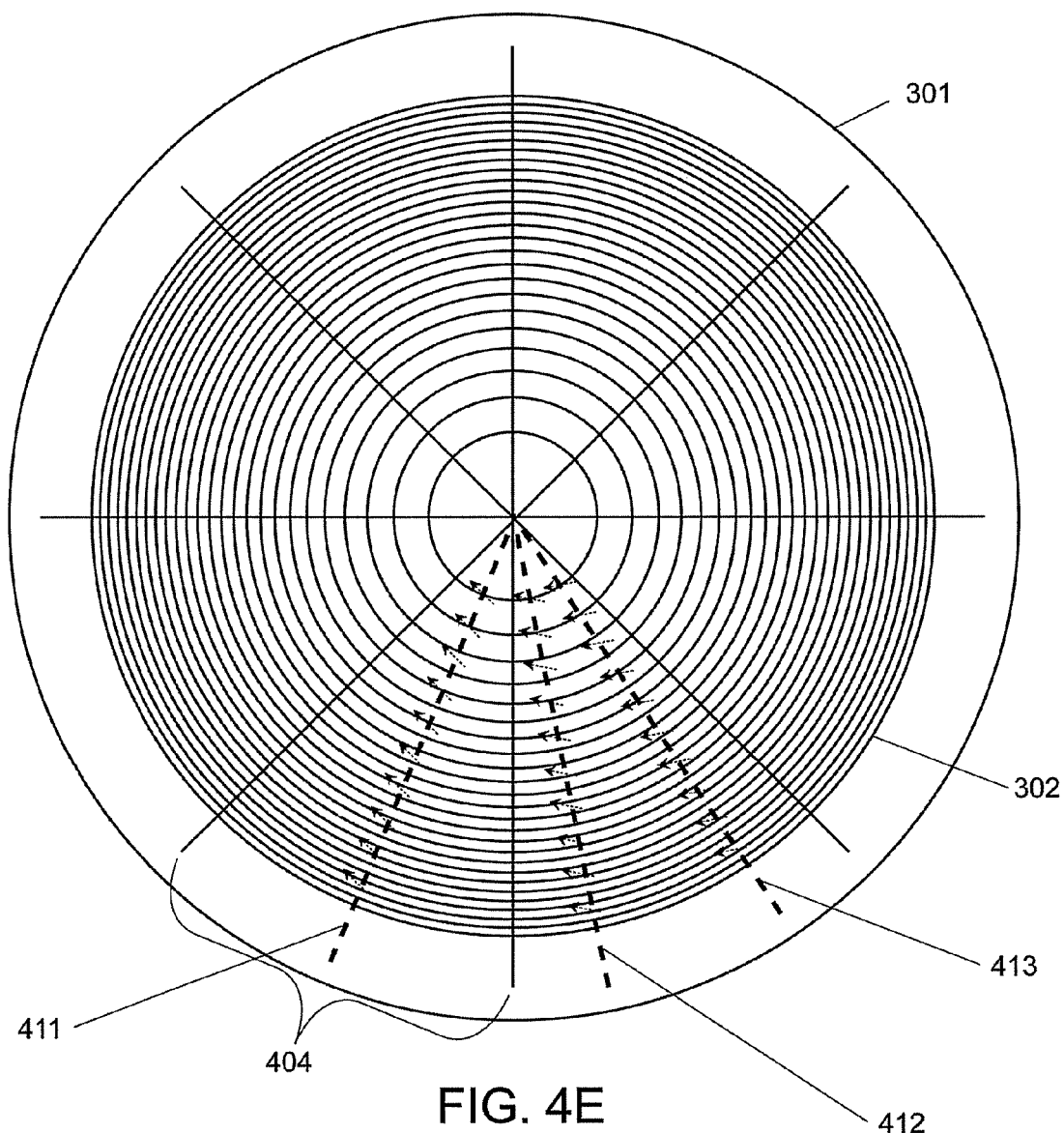

In an oblique alignment of the liquid crystalline material, the alignment direction is substantially oriented at a predetermined angle, θ, with respect to the direction tangential to the diffractive structures for every point along the diffractive structures as shown in FIG. 4D. In a piecewise oblique alignment, a diffractive optical power region may be divided into sections or wedges 404 as shown in FIG. 4E, wherein each section comprises 1 degree to 90 degrees of arc, for example. Within each section 404, the alignment direction may be at substantially the predetermined angle, θ, with respect to the direction tangential to the diffractive structures along a single locus of points 411 or along multiple loci of points 412 and 413, by way of example only. Although only two loci of points are shown, it is to be understood that any number of loci of points may be used.

In embodiments of the present invention, the homogeneous alignment that is one of a tangential alignment, a piecewise tangential alignment, a perpendicular alignment, a piecewise perpendicular alignment, an oblique alignment, a piecewise oblique alignment, a continuous intra-zone alignment, a piecewise continuous intra-zone alignment, or a combination thereof may result in optimal or near optimal alignment of the liquid crystalline material thereby resulting in improved optics and fewer vision compromises.

Figure 5A:
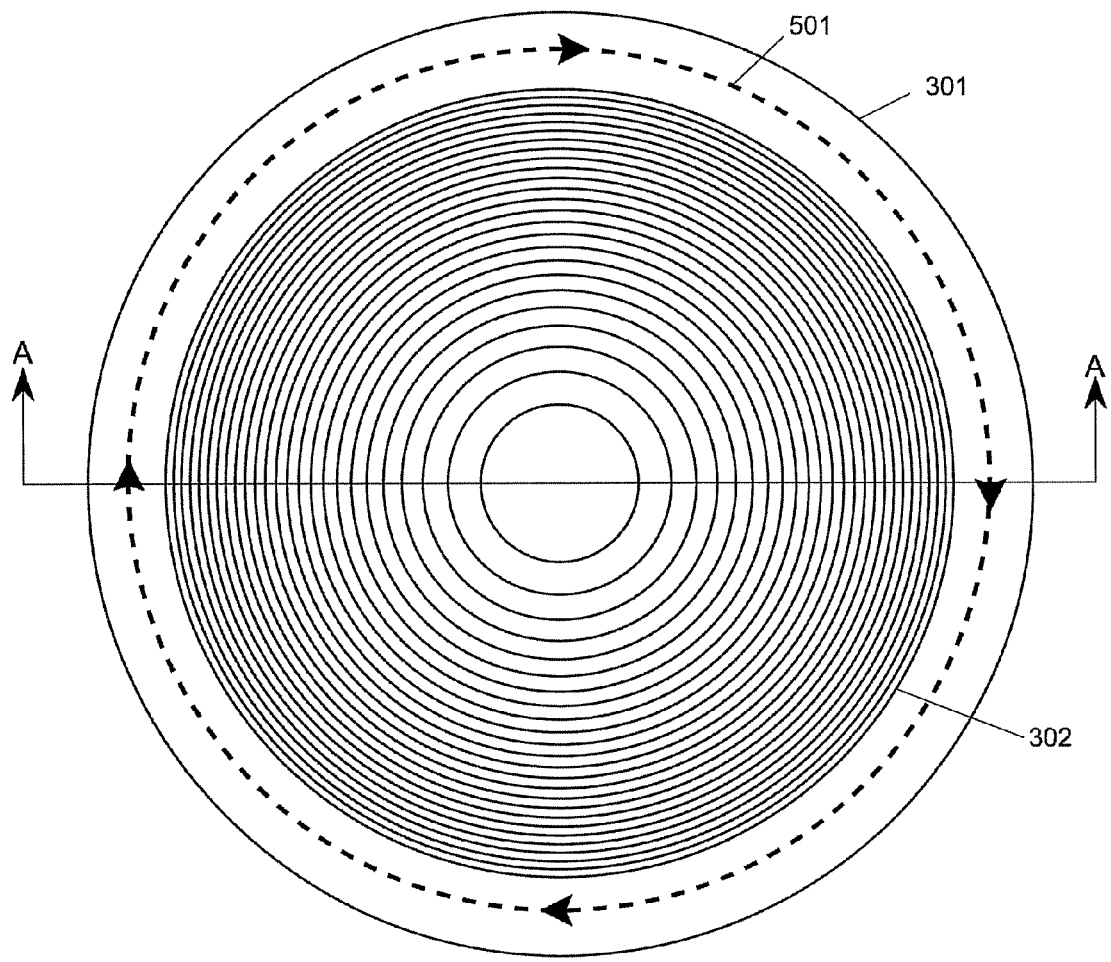
FIG. 5A shows a substrate having a diffractive optical power region with an alignment layer disposed thereon that has been tangentially aligned according to an embodiment of the present invention.
Figure 5B:
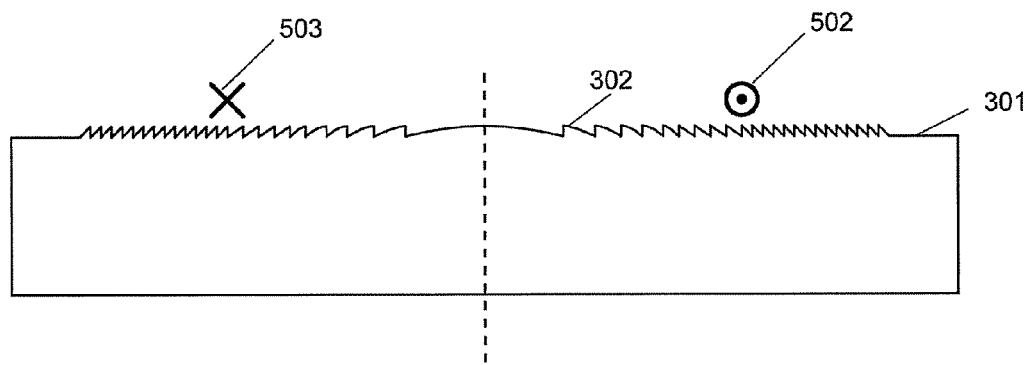
FIG. 5B shows a cross-sectional side view of the substrate of FIG. 5A taken along axis AA according to an embodiment of the present invention.

The substrate 301 of FIG. 4A may be useful for determining an ideal or preferred alignment of the liquid crystalline material. FIG. 5A shows a substrate 301 having a diffractive optical power region 302 with an alignment layer disposed thereon that has been tangentially aligned according to an embodiment of the present invention. A tangential alignment 501 may be used when ideal performance is achieved when the liquid crystalline material is aligned tangential to the surface relief diffractive structures. The direction of tangential alignment 501 is shown as clockwise, but in an embodiment of the present invention a counter-clockwise direction may be used. FIG. 5B shows a cross-sectional view of the substrate of FIG. 5A taken along axis AA according to an embodiment of the present invention. As can be seen in FIG. 5B the alignment of the liquid crystalline material may be tangential to the surface relief diffractive structures in all cases. However, the alignment direction points in opposite directions (out of plane at point 502 and into the plane at point 503) at opposite sides of the diffractive optical power region.

Figure 6A:
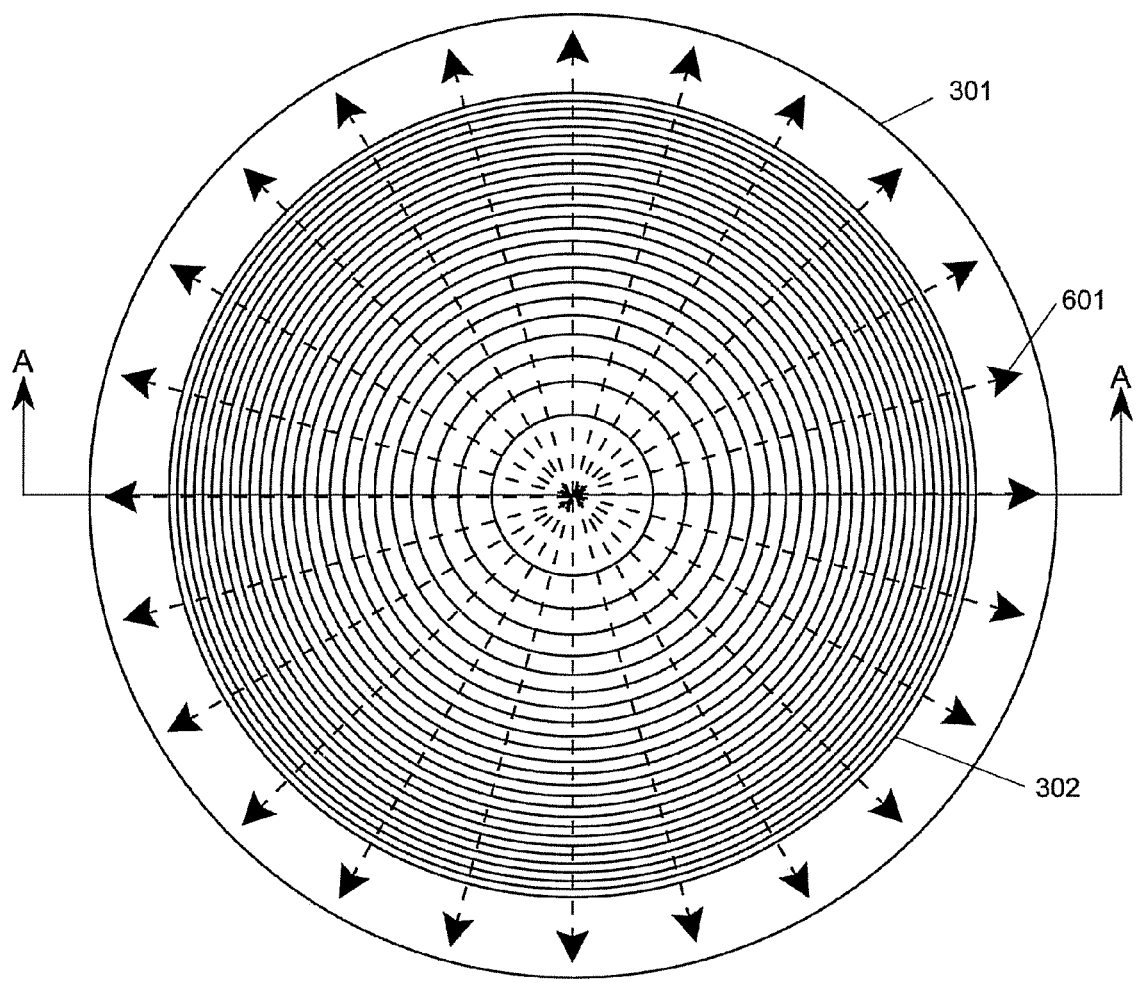
FIG. 6A shows a substrate having diffractive optical power region with an alignment layer disposed thereon that has been perpendicularly aligned according to an embodiment of the present invention.
Figure 6B:
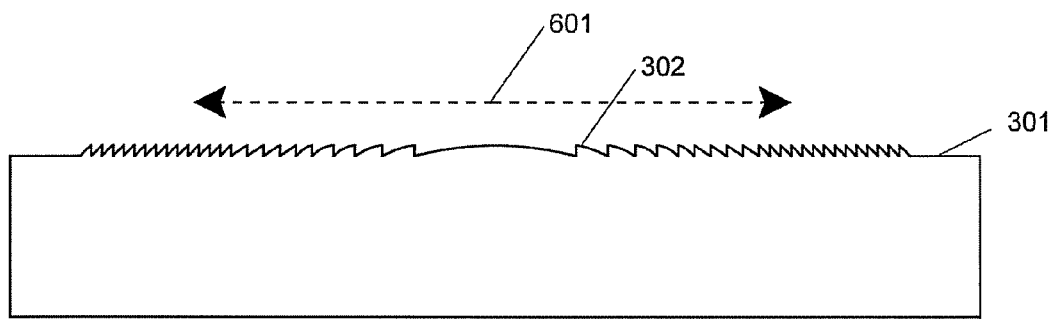
FIG. 6B shows a cross-sectional side view of the substrate of FIG. 6A taken along axis AA according to an embodiment of the present invention.

FIG. 6A shows a substrate 301 having a diffractive optical power region 302 with an alignment layer disposed thereon that has been perpendicularly aligned according to an embodiment of the present invention. A perpendicular alignment 601 may be used when ideal performance is achieved when the liquid crystalline material is aligned perpendicular to the surface relief diffractive structures. The direction of perpendicular alignment 601 is shown as outward-from-center, but in an embodiment of the present invention an inward-toward-center direction may be used. FIG. 6B shows a cross-sectional view of the substrate of FIG. 6A taken along axis AA according to an embodiment of the present invention. As can be seen in FIG. 6B the alignment of the liquid crystalline material may be perpendicular to the surface relief diffractive structures in all cases. However, the alignment direction points in opposite directions (shown as left and right by dual arrow 601) at opposite sides of the diffractive optical power region.

Figure 7A:
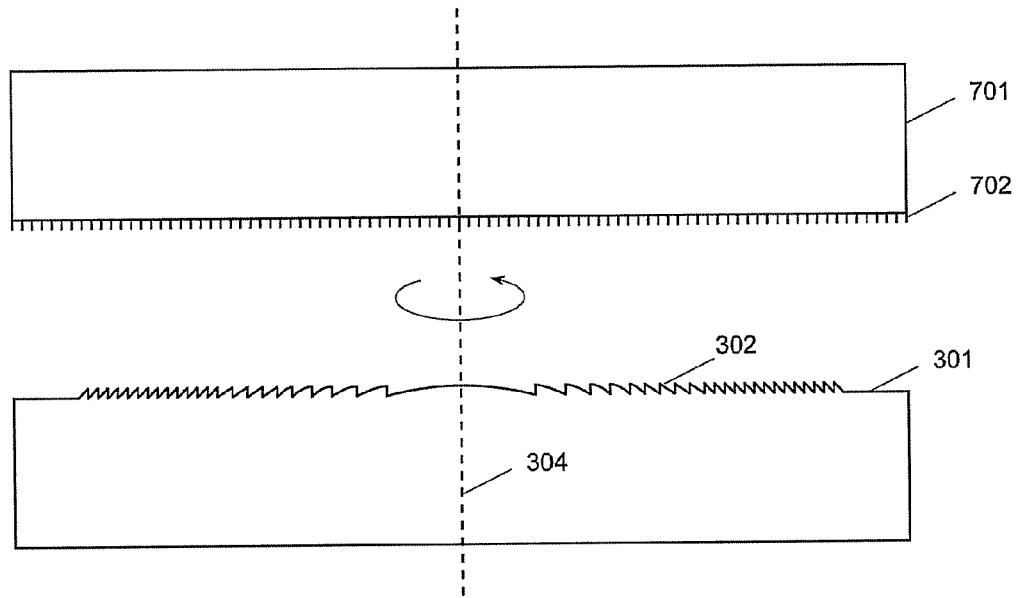
FIG. 7A shows a first method of achieving tangential alignment using rubbed or brushed alignment materials according to an embodiment of the present invention.

Tangential alignment may be achieved using any one of several methods. FIG. 7A shows a first method of achieving tangential alignment using rubbed or brushed alignment materials according to an embodiment of the present invention. In a first step of the method, a substrate 301 having a diffractive optical power region 302 may be provided. The diffractive optical power region may have an alignment material disposed thereon. A soft cloth 702 may be placed on a block 701. As shown in FIG. 7A, the portion of the block covered with the soft cloth may be as wide as or wider than the diffractive optical power region of the substrate. The block may also be narrow in a direction orthogonal to this width (into the page). The soft cloth may have fibers that are long enough to rub or buff the entire depth of the surface relief diffractive structures (i.e., the fibers are long enough to reach the troughs of the surface relief diffractive structures). In a second step of the method, the block with the soft cloth may be brought into contact with the diffractive optical power region. In a third step of the method, the block with the soft cloth may be rotated relative to the substrate about a geometric center 304 of the diffractive optical power region. It is important to note that either or both of the block with the soft cloth or the substrate may be rotated as long as relative rotation about the geometric center 304 is achieved.

Figure 7B:
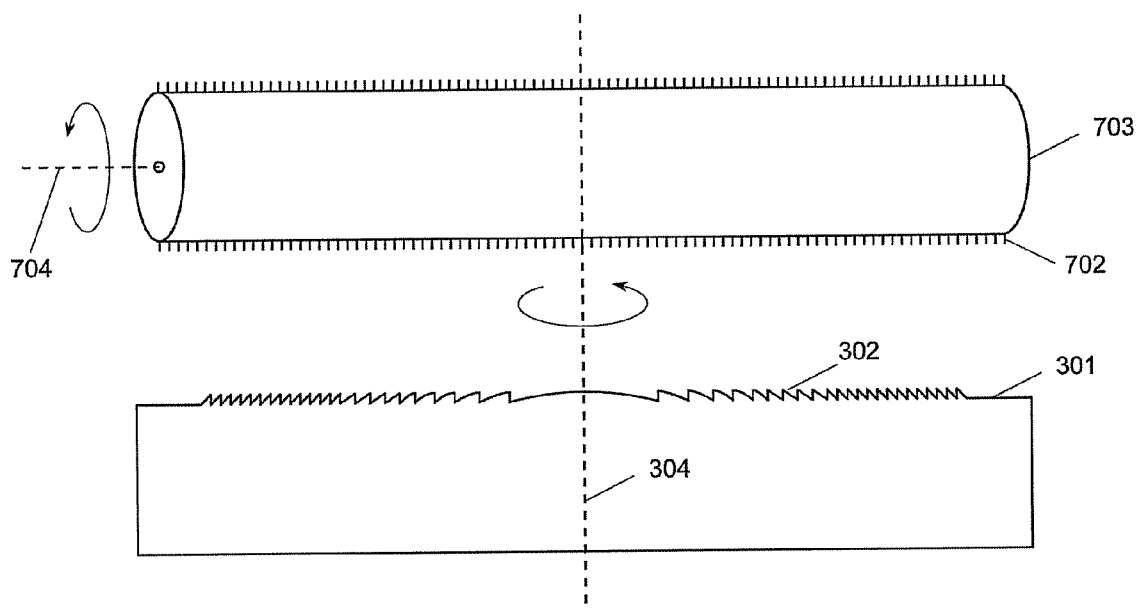
FIG. 7B shows a second method of achieving tangential alignment using rubbed or brushed alignment materials according to an embodiment of the present invention.

FIG. 7B shows a second method of achieving tangential alignment using rubbed or brushed alignment materials according to an embodiment of the present invention. In a first step of the method, a substrate 301 having a diffractive optical power region 302 may be provided. The diffractive optical power region may have an alignment material disposed thereon. A soft cloth 702 may be wrapped around a roller or drum 703. As shown in FIG. 7B, the portion of the roller or drum covered with the soft cloth may be as wide as or wider than the diffractive optical power region of the substrate. The diameter of the roller or drum may be narrow. As above, the soft cloth may have fibers that are long enough to rub or buff the entire depth of the surface relief diffractive structures. In a second step of the method, the roller or drum with the soft cloth may be brought into contact with the diffractive optical power region. In a third step of the method, the roller or drum with the soft cloth may be rotated relative to the substrate about a geometric center 304 of the diffractive optical power region. At the same time, the roller or drum may be rotated about its own axis 704. It is important to note that either or both of the roller or drum with the soft cloth or the substrate may be rotated as long as relative rotation about the geometric center 304 is achieved. In certain embodiments of the present invention, the roller or drum does not rotate about its own axis 704. Instead, there may only be relative rotation between the roller or drum and the substrate about the geometric center of the diffractive optical power region.

Figure 8:
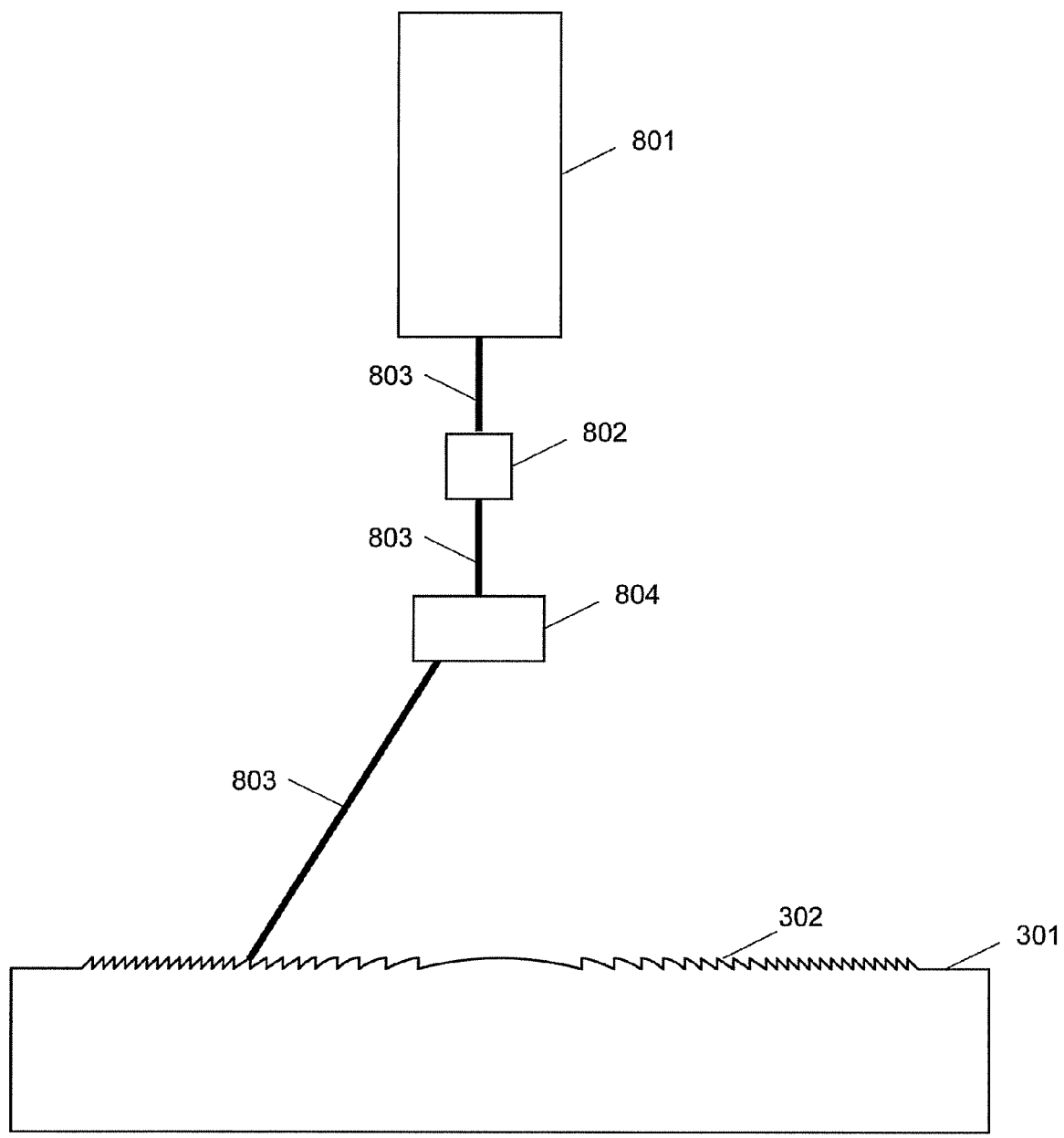
FIG. 8 shows a first method of achieving tangential alignment using UV photosensitive alignment materials according to an embodiment of the present invention.

FIG. 8 shows a first method of achieving tangential alignment using UV photosensitive alignment materials according to an embodiment of the present invention. In a first step of the method, a substrate 301 having a diffractive optical power region 302 may be provided. The diffractive optical power region may have a UV photosensitive alignment material disposed thereon. In a second step of the method, a UV laser source 801 with linear polarization-controlling optics 802 may be provided. Linear polarization-controlling optics 802 may be an electro-optical modulator such as a Pockels cell, by way of example only. The UV laser source may be capable of producing a UV laser beam 803. In a third step of the method, the beam may be raster scanned (e.g., using Cartesian coordinates x,y) or polar scanned (e.g., using Polar coordinates r, θ) using 2-dimensional beam-scanning optics 804 across the diffractive optical power region while the substrate is stationary. The polarization direction may be substantially tangent or perpendicular to the diffractive structures of the diffractive optical power region depending on the alignment material used. By way of example only, the UV photosensitive alignment material ROP-103 from Rolic Technologies Ltd. aligns liquid crystal parallel to the polarization direction and as such, polarization direction corresponds exactly to the alignment direction. The UV laser source 801, the polarization-controlling optics 802, and the 2-dimensional beam-scanning optics 804 may be controlled by a computer that executes instructions stored on a computer-readable storage medium. The instructions may ensure that the proper tangential alignment is obtained at all points of the surface relief diffractive structure.

Figure 9:
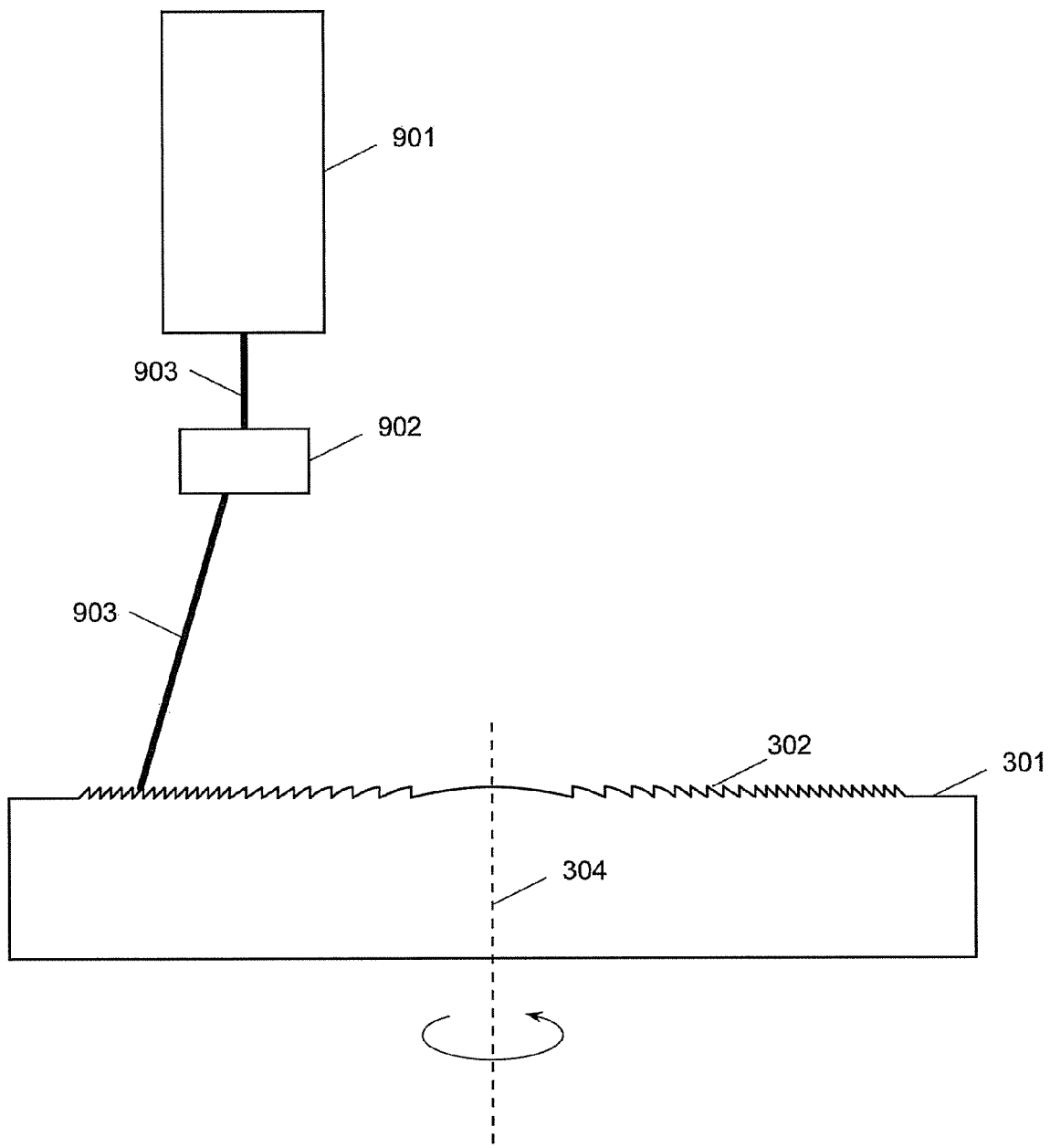
FIG. 9 shows a second method of achieving tangential alignment using UV photosensitive alignment materials according to an embodiment of the present invention.

FIG. 9 shows a second method of achieving tangential alignment using UV photosensitive alignment materials according to an embodiment of the present invention. In a first step of the method, a substrate 301 having a diffractive optical power region 302 may be provided. The diffractive optical power region may have a UV photosensitive alignment material disposed thereon. In a second step of the method, a UV laser source 901 with linear polarization-controlling optics 902 may be provided. The UV laser source may be capable of producing a UV laser beam 903. In a third step of the method, the beam may be scanned in a 1-dimensional fashion across the diffractive optical power region while the substrate is rotated about a geometric center 304 diffractive optical power region. As described above, the polarization direction may be substantially tangent or perpendicular to the diffractive structures of the diffractive optical power region depending on the alignment material used. The UV laser source 901 and the polarization-controlling optics 902 may be controlled by a computer that executes instructions stored on a computer-readable storage medium. The instructions may ensure that the proper tangential alignment is obtained at all points of the surface relief diffractive structure.

Figure 10:
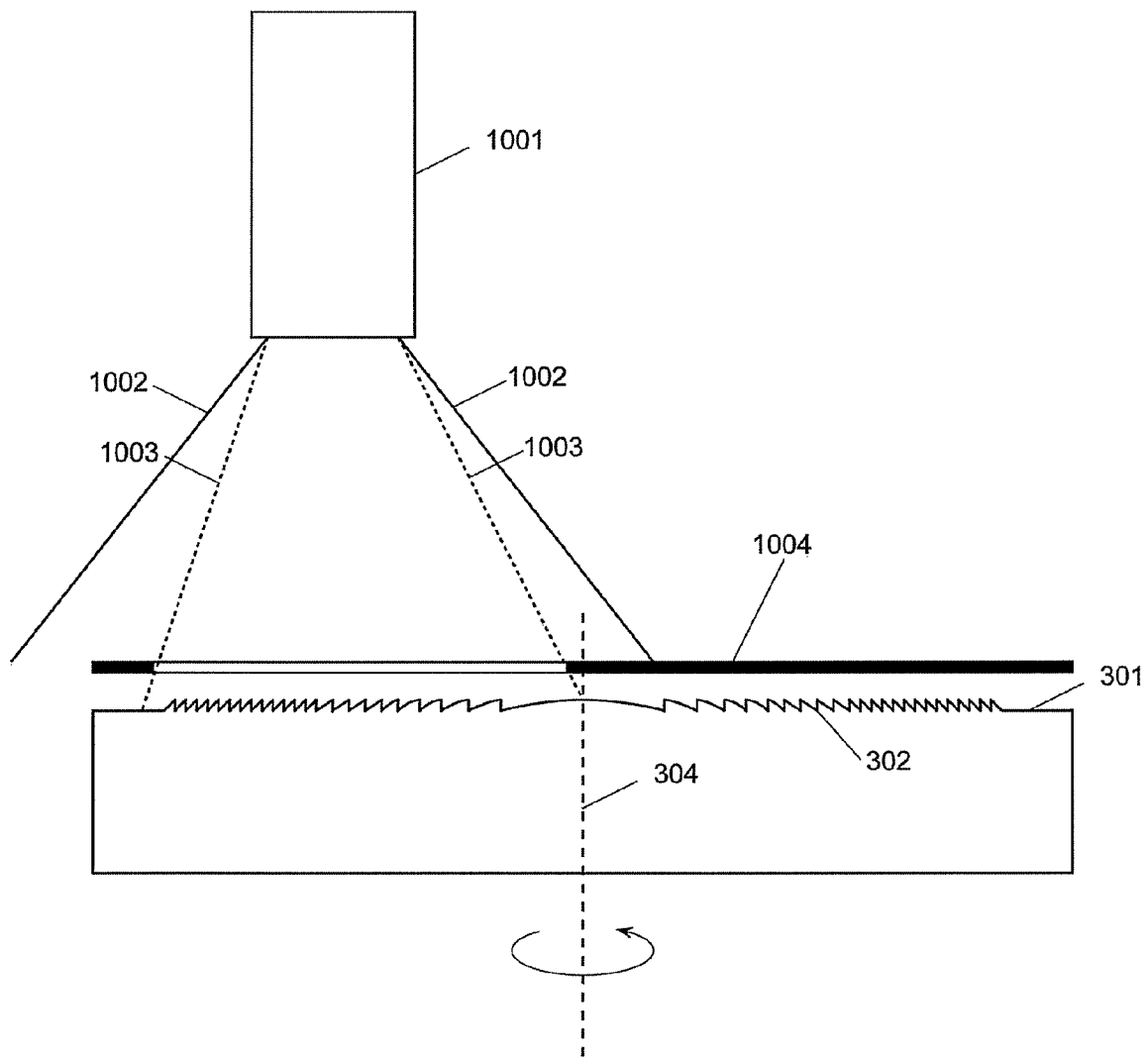
FIG. 10 shows a third method of achieving tangential alignment using UV photosensitive alignment materials according to an embodiment of the present invention.
Figure 11:
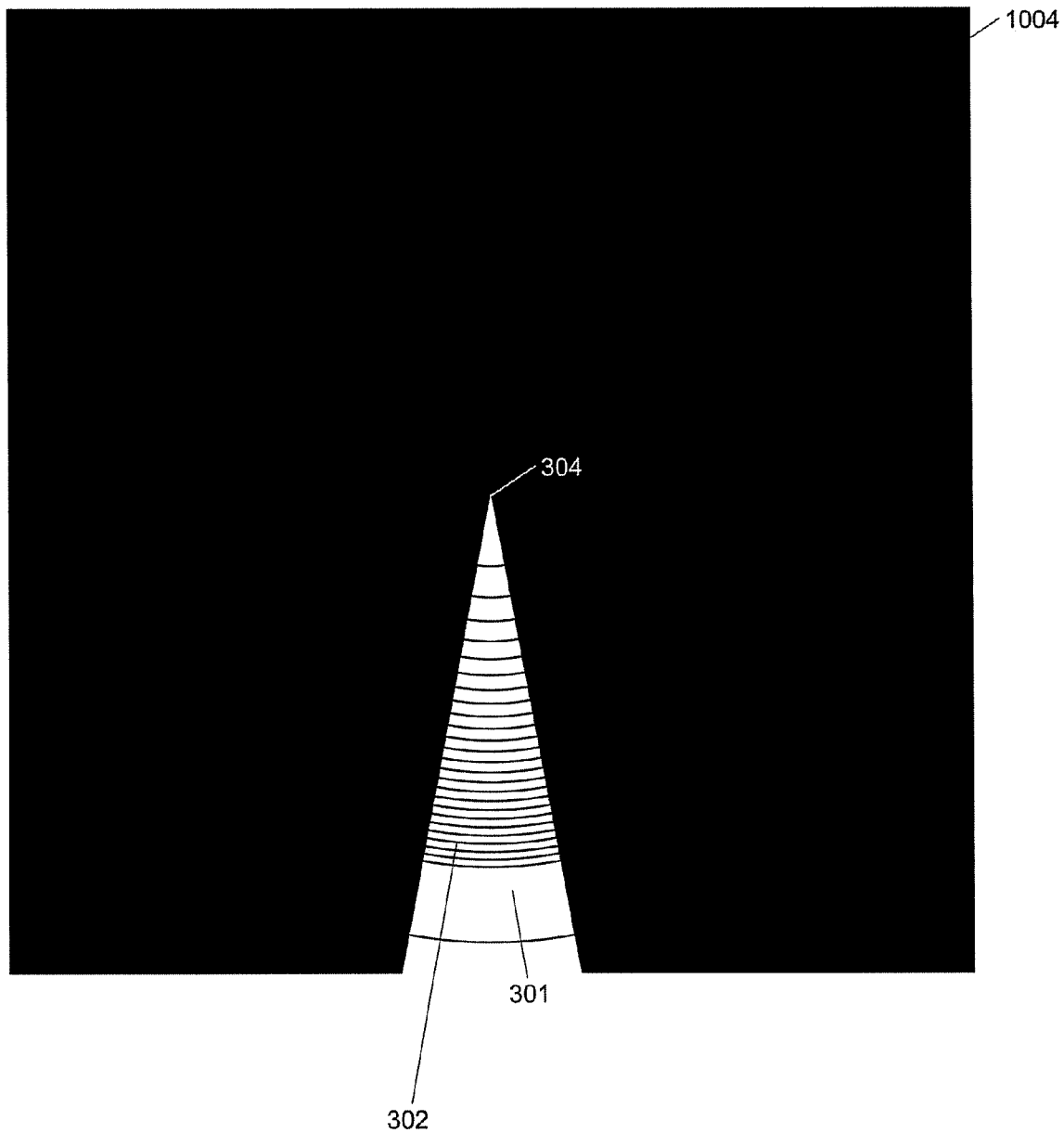
FIG. 11 shows a top view of the shadow mask of FIG. 10 according to an embodiment of the present invention.

FIG. 10 shows a third method of achieving tangential alignment using UV photosensitive alignment materials according to an embodiment of the present invention. In a first step of the method, a substrate 301 having a diffractive optical power region 302 may be provided. The diffractive optical power region may have a UV photosensitive alignment material disposed thereon. In a second step of the method, a non-laser, linearly polarized UV source 1001 may be provided. The non-laser, linearly polarized UV source may be capable of producing a flood exposure 1002. In a third step of the method, a shadow mask 1004 may be provided to partially occlude a portion of the flood exposure 1002 while allowing a portion of the flood exposure through exposure region 1003. FIG. 11 shows a top view of the shadow mask 1004 of FIG. 10 according to an embodiment of the present invention. The mask may allow light to pass through a wedge-shaped region. Alternatively, the mask may allow light to pass through a narrow slit of uniform width. Mask 1004 may be an optical mask constructed from a UV transmissive substrate material such as, for example, quartz or fused silica. The UV transmissive substrate may be covered with an opaque material that has exposure region 1003 selectively removed to allow passage of UV radiation. Alternatively, mask 1004 may be a physical mask constructed from an opaque substrate such as, for example, metal that has exposure region 1003 removed from it to allow the passage of UV radiation. The portion of the flood exposure that passes through the exposure region may be incident on the surface relief diffractive structures. As described above, the polarization direction may be substantially tangent or perpendicular to the diffractive structures of the diffractive optical power region depending on the alignment material used. In a fourth step of the method, the substrate may be rotated about a geometric center 304 of the diffractive optical power region. It should be noted that the alignment described in FIGS. 10-11 may be a piecewise tangential alignment. The size and shape of the exposure region 1003 may determine how far from ideal the piecewise tangential alignment is.

Perpendicular alignment may be achieved using any one of several methods. For example, the methods shown in FIGS. 8-11 may be used to achieve perpendicular alignment if the direction of polarization of UV light is rotated by 90 degrees (i.e., if the UV light was polarized tangent to the diffractive structures for tangential alignment it is polarized perpendicular to the diffractive structures for perpendicular alignment and vice versa).

Figure 12A:
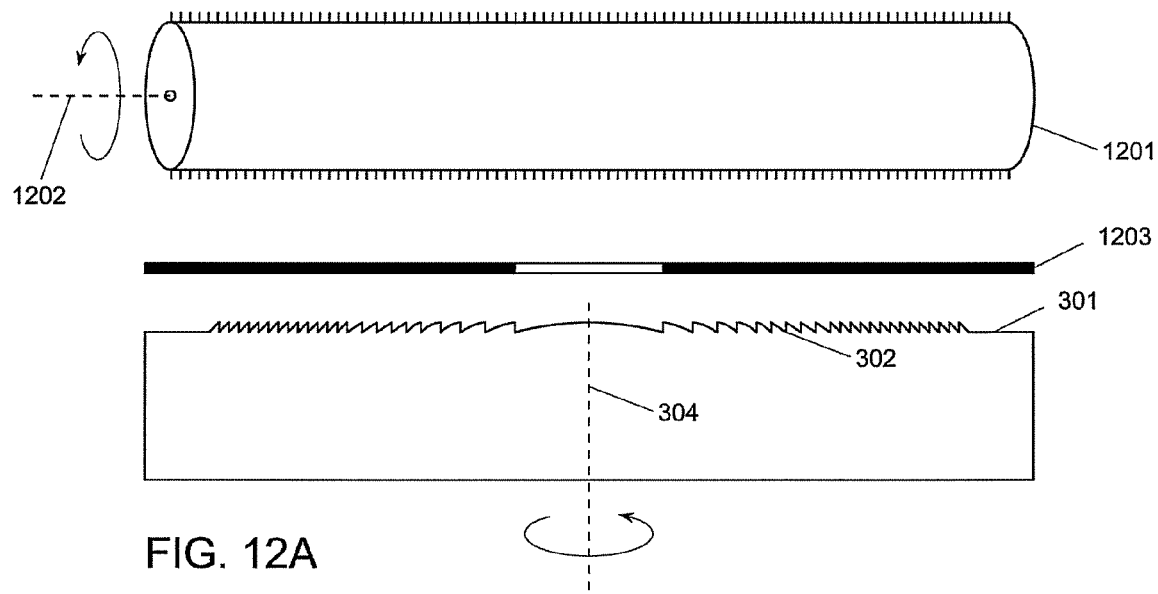
FIG. 12A shows a first method of achieving perpendicular alignment using rubbed or brushed alignment materials according to an embodiment of the present invention.

FIG. 12A shows a first method of achieving perpendicular alignment using rubbed or brushed alignment materials according to an embodiment of the present invention. In a first step of the method, a substrate 301 having a diffractive optical power region 302 may be provided. The diffractive optical power region may have an alignment material disposed thereon. A soft cloth may be wrapped around a roller or drum 1201. As shown in FIG. 12A, the portion of the roller or drum covered with the soft cloth may be as wide as or wider than the diffractive optical power region of the substrate. The diameter of the roller or drum may be narrow. As above, the soft cloth may have fibers that are long enough to rub or buff the entire depth of the surface relief diffractive structures. In a second step of the method, the roller or drum with the soft cloth may be brought into contact with the diffractive optical power region. A physical mask 1203 may be used to restrict the portion of the soft cloth that comes into contact with the diffractive optical power region. In a third step of the method, the roller or drum with the soft cloth may be rotated about its own axis 1202. Thus, the rotating roller or drum may move across the substrate in a radial direction (edge to center or center to edge), only coming into contact with those areas of the diffractive optical power region 302 accessible through physical mask 1203. In a fourth step of the method, after the area defined by the mask 1203 has been suitably treated, the roller or drum may be taken out of contact with the diffractive optical power region. In a fifth step of the method, the substrate may be rotated about a geometric center 304 of the diffractive optical power region thereby allowing previously untreated areas of the diffractive optical power region to be treated. Steps 2-5 of the method may be repeated until the entire diffractive optical power region has been treated.

Figure 12B:
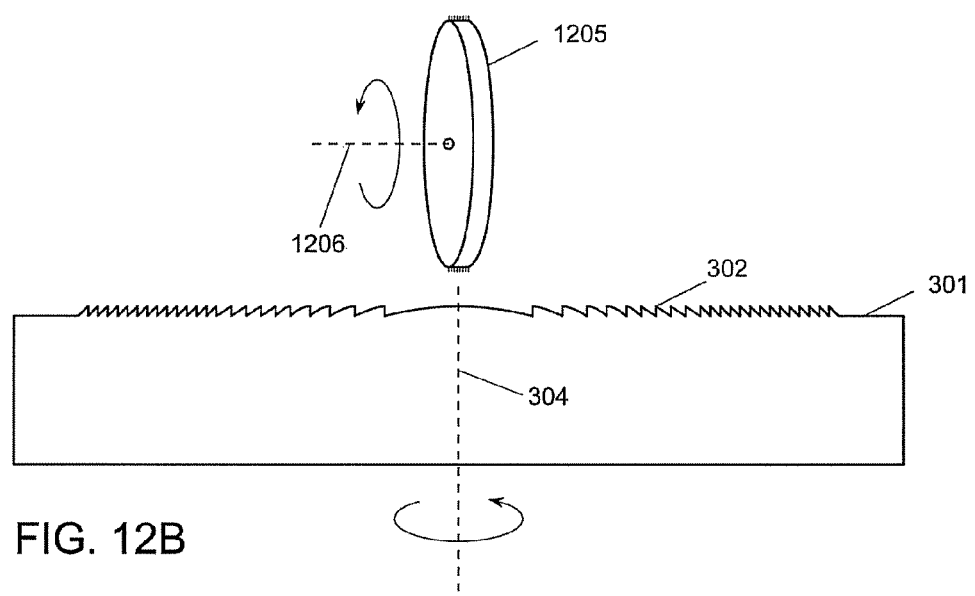
FIG. 12B shows a second method of achieving perpendicular alignment using rubbed or brushed alignment materials according to an embodiment of the present invention.

FIG. 12B shows a second method of achieving perpendicular alignment using rubbed or brushed alignment materials according to an embodiment of the present invention. The method of FIG. 12B may be identical to the method of FIG. 12A except a physical mask may not be necessary. To eliminate the need for a physical mask, a narrow cloth covered roller or drum 1205 capable of rotating about its axis 1206 may be used. The method for using the narrow cloth covered drum or roller 1205 may be similar to the method used for using the wide cloth covered roller or drum 1201 in that after each radial pass (edge to center or center to edge), the substrate 301 must be rotated about a geometric center 304 of the diffractive optical power region so that other areas of the surface relief diffractive structure may be treated. It should be noted that the alignment described in FIGS. 12A-12B may be a piecewise perpendicular alignment. The size and shape of the mask 1203 may determine how far from ideal the piecewise perpendicular alignment is.

Figure 13:
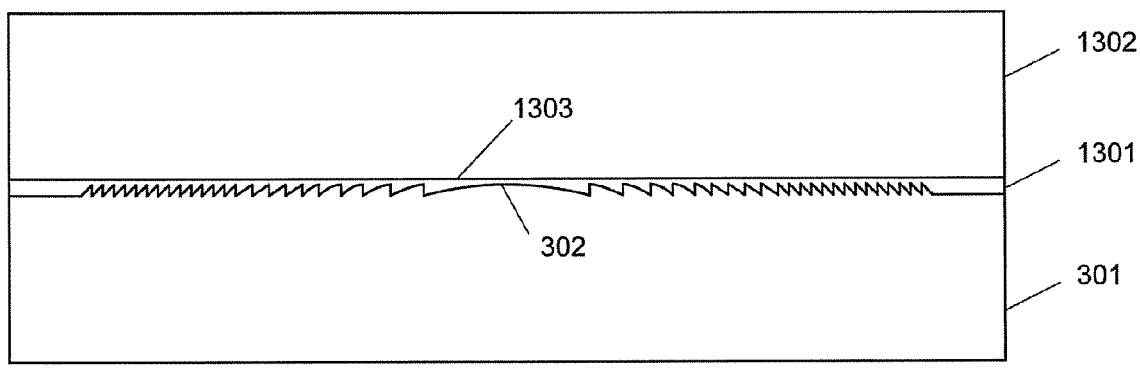
FIG. 13 shows a layer of liquid crystalline material constrained between a first substrate having a diffractive optical power region and a second substrate according to an embodiment of the present invention.

FIG. 13 shows a layer of liquid crystalline material 1301 constrained between a first substrate 301 having a diffractive optical power region 302 and a second substrate 1302 according to an embodiment of the present invention. The alignment of the liquid crystalline material at the interface with the first substrate has been discussed above with reference to embodiments of the present invention. In an embodiment of the present invention, the alignment of the liquid crystalline material at interface 1303 with the second substrate may be homeotropic (i.e., vertical). In another embodiment of the present invention, the alignment at interface 1303 may be identical to the alignment at the interface with the first substrate. In another embodiment of the present invention, the alignment at interface 1303 may be the same type (i.e., linear, tangential, perpendicular, oblique, or any of their piecewise variations) to the alignment at the interface with the first substrate but in a different direction. For example, the alignment at the interface with the first substrate may be tangential and clockwise, while the alignment at interface 1303 may be tangential and counterclockwise. As another example, the alignment at the interface with the first substrate may be perpendicular and inward, while the alignment at interface 1303 may be perpendicular and outward. In another embodiment of the present invention, the alignment at interface 1303 may be of a different type than the alignment at the interface with the first substrate (i.e., one alignment may be perpendicular while the other alignment is tangential). In yet another embodiment of the present invention, the alignment at interface 1303 may be linear.

Figure 14:
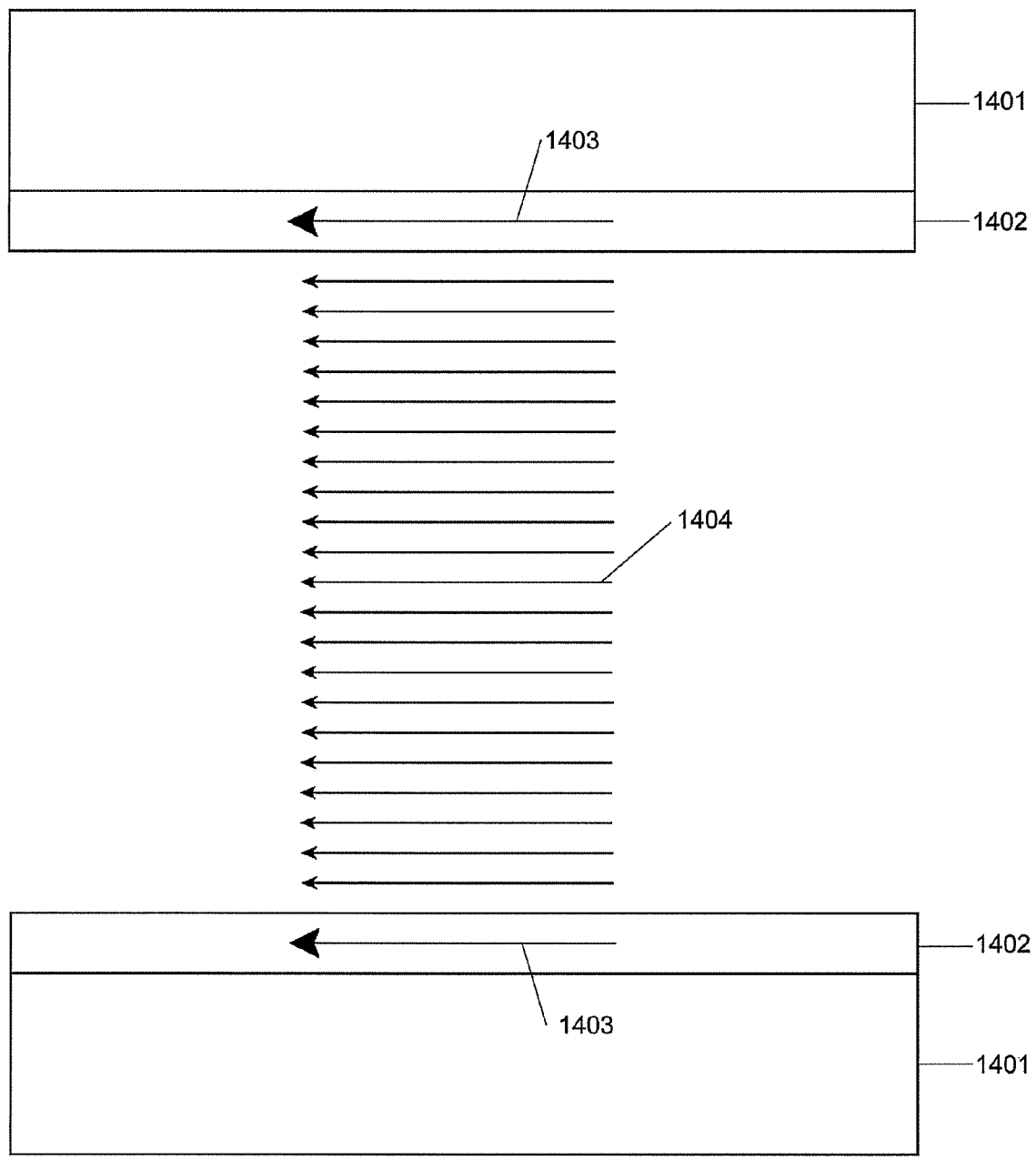
FIG. 14 shows a layer of nematic liquid crystal constrained between two identical substrates according to an embodiment of the present invention.

Alignment according to embodiments of the present invention can be used with many different phases of liquid crystalline materials including, but not limited to nematic, cholesteric, and smectic phases. However, there may be phases where the aforementioned techniques must be modified. FIG. 14 shows a layer of nematic liquid crystal constrained between two identical substrates 1401 according to an embodiment of the present invention. The two identical substrates may be coated with homogeneous alignment layers 1402 where the alignment directions 1403 are linear and mostly parallel. In such a device, the liquid crystal directors 1404 may be mostly parallel with the alignment direction 1403, as is well known in the art. As mentioned above, the liquid crystal director is a unit vector describing the average direction of orientation for liquid crystal molecules over a given region of the liquid crystal bulk. As shown in FIG. 14, the directors 1404 are the same everywhere throughout the bulk.

Figure 15:
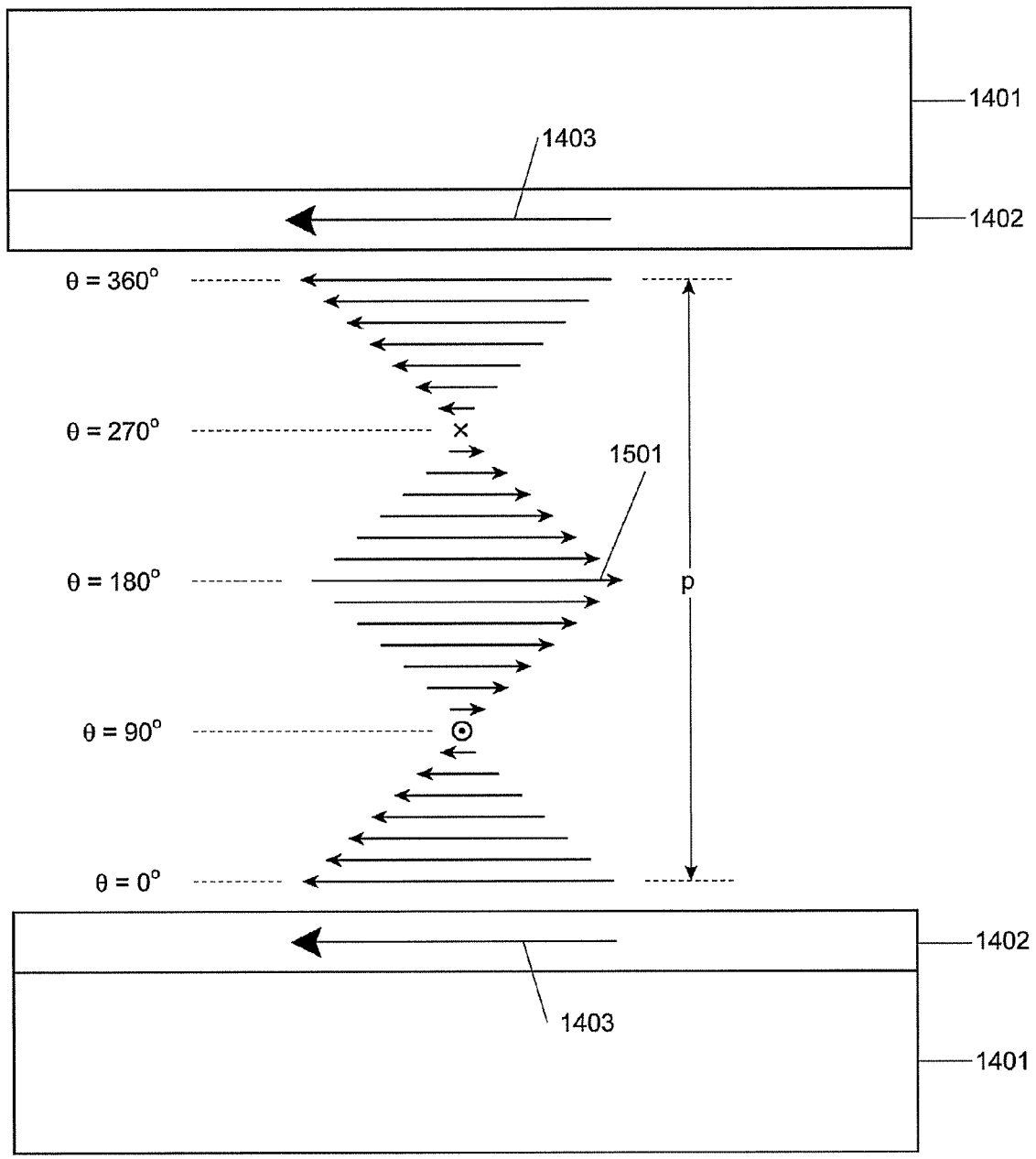
FIG. 15 shows a layer of cholesteric liquid crystal constrained between two identical substrates according to an embodiment of the present invention.

FIG. 15 shows a layer of cholesteric liquid crystal constrained between two identical substrates 1401 according to an embodiment of the present invention. The two identical substrates may be coated with homogeneous alignment layers 1402 where the alignment directions 1403 are linear and mostly parallel. In such a device, the liquid crystal directors 1501 rotate in a helical manner throughout the bulk of the material, where the distance over which the director rotates by a full 360 degrees is referred to as the twist pitch (p). As is shown in FIG. 15, the directors 1501 vary throughout the bulk and as such, may present problems for pure perpendicular or tangential alignment.

Figure 16:
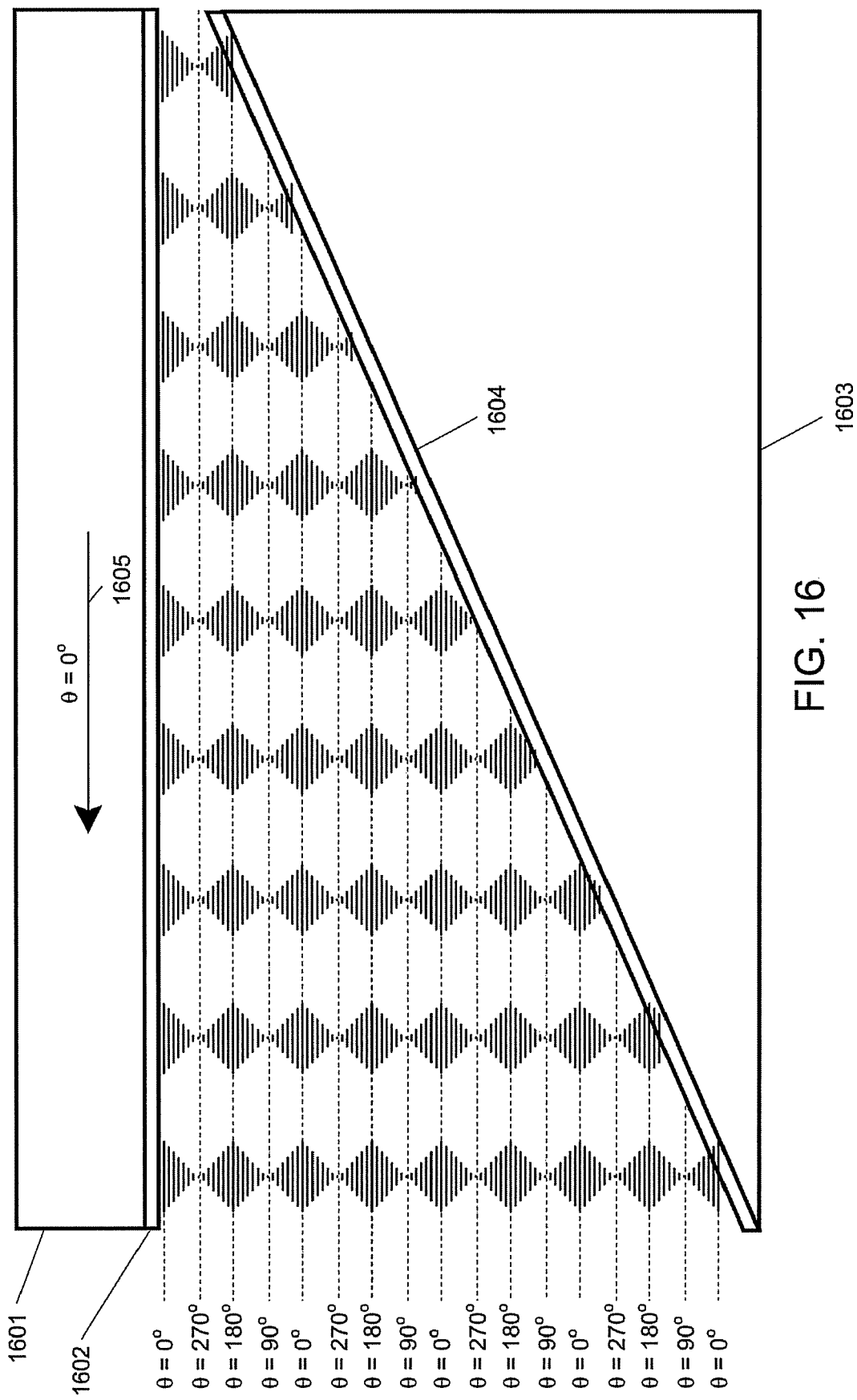
FIG. 16 shows a single Fresnel zone of a first substrate having a diffractive optical power region with a cholesteric liquid crystal (CLC) constrained between the first substrate and a second substrate according to an embodiment of the present invention.

FIG. 16 shows a single surface relief diffractive structure of a first substrate 1603 having a cholesteric liquid crystal (CLC) constrained between the first substrate and a second substrate 1601 according to an embodiment of the present invention. The first substrate may be coated with an alignment material 1604 and the second substrate may be coated with an alignment material 1602. As shown in FIG. 16, the CLC may have a twist pitch several times smaller than the maximum distance between the two substrates (i.e., the CLC thickness). The alignment direction 1605 of layer 1602 may be uniform and linear. A problem may arise in determining the proper alignment direction of alignment layer 1604. If the alignment direction of alignment layer 1604 is identical to that of alignment layer 1602, the alignment direction will only be correct at those points where the CLC director is at 0 or 180 degrees, and incorrect for all other orientations of the director. Likewise, if the alignment direction of alignment layer 1604 is orthogonal to the alignment direction of alignment layer 1602, the alignment direction will only be correct at those points where the CLC director is at 90 or 270 degrees, and incorrect for all other orientations of the director. This problem is well known in applications that make use of CLC in devices with variable thickness and may lead to Grandjean disclinations. Grandjean disclinations are discontinuities in CLC orientation between regions of similar alignment. Grandjean disclinations may also be referred to as domain boundaries. These disclinations may scatter light. Electro-active elements made with CLC that have disclinations may appear hazy and hence undesirable for use as or in a spectacle lens.

In an embodiment of the present invention, one method of eliminating Grandjean disclinations may be to smoothly and continuously vary the alignment direction of at least one of the alignment layers within each surface relief diffractive structure so as to track the change of the CLC director as the director changes with CLC thickness. This is referred to as continuous intra-zone alignment. In an embodiment of the present invention, in a continuous intra-zone alignment, the alignment direction may be substantially aligned with the CLC director at every point along the diffractive structure. In other embodiments of the present invention, the alignment direction may be substantially aligned with the CLC director in a piecewise manner for each diffractive structure. For example, a diffractive structure may be divided into two or more sections from its crest to its trough, inclusive. In an embodiment of the present invention, a piecewise continuous intra-zone alignment may align the CLC director to be substantially aligned to the diffractive structure at only one or more points within each section of the diffractive structure.

Figure 17A:
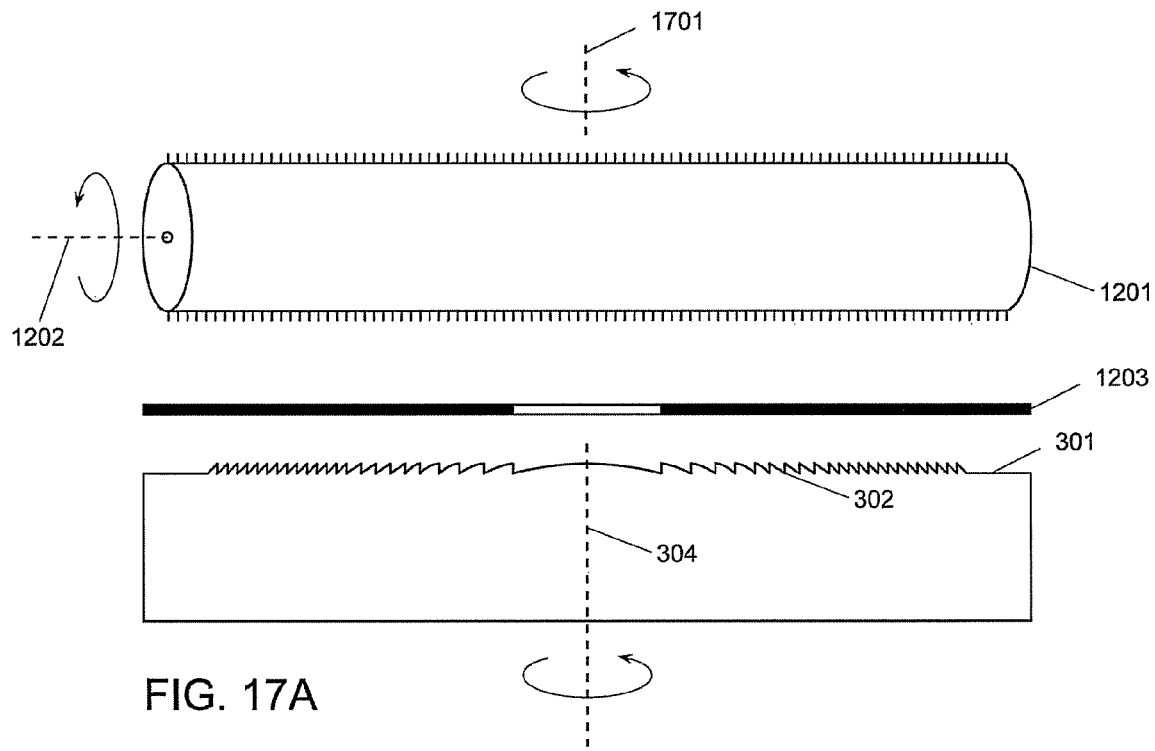
FIGS. 17A and 17B show methods of achieving continuous intra-zone alignment using rubbed or brushed alignment materials according to an embodiment of the present invention.
Figure 17B:
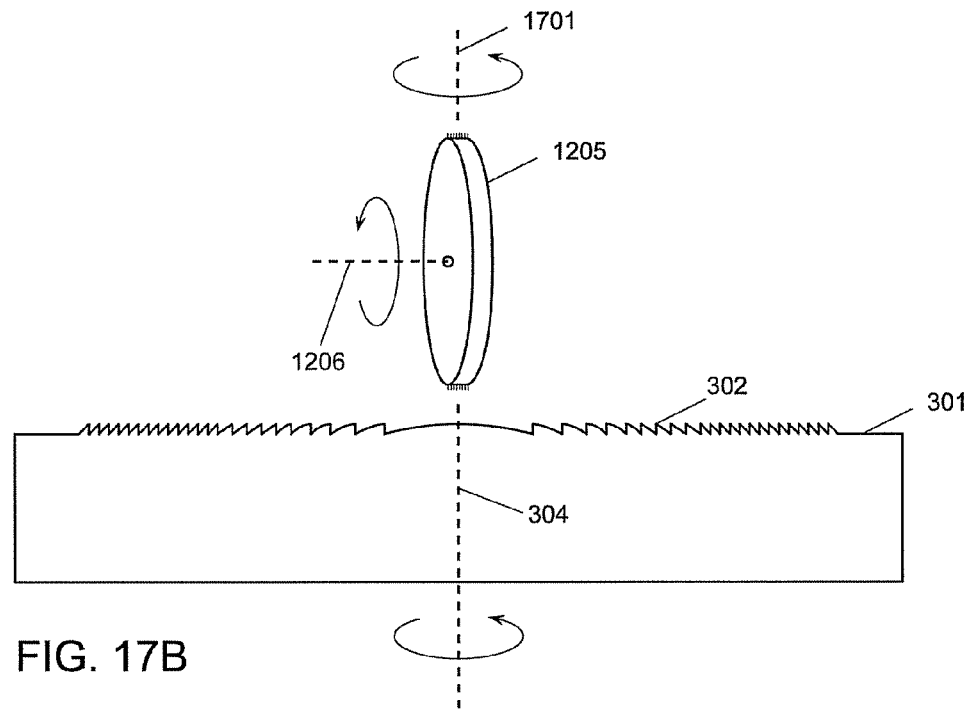

FIGS. 17A and 17B show methods of achieving continuous intra-zone alignment using rubbed or brushed alignment materials according to an embodiment of the present invention. FIG. 17A shows that the perpendicular alignment described in reference to FIG. 12A may be modified to create a continuous intra-zone alignment. Similarly, FIG. 17B shows that the perpendicular alignment described in reference to FIG. 12B may be modified to create a continuous intra-zone alignment. In FIGS. 17A and 17B, the motion of the wide cloth covered roller or drum 1201 and the narrow cloth covered roller or drum 1205 may be modified to also rotate about a vertical axis 1701. In the step of the method where the roller or drum moves in a radial direction (edge to center or center to edge) across the surface of a substrate 301 it may also rotate about vertical axis 1701 in a continuous manner as it traverses a single surface relief diffractive structure of diffractive optical power region 302. The mask 1203 may expose many Fresnel zones from center to edge as is shown in FIG. 11. The angle of the roller or drum about axis 1701 may vary continuously within each Fresnel zone but may then jump to a new angle at each Fresnel zone boundary. Therefore, the angle of the roller or drum about vertical axis 1701 may change discontinuously as it traverses the boundaries between adjacent Fresnel zones. After each radial pass (edge to center or center to edge) where one area of the substrate has been treated, the substrate may be rotated about a geometric center 304 of the diffractive optical power region so that other areas may be treated.

Figure 18:
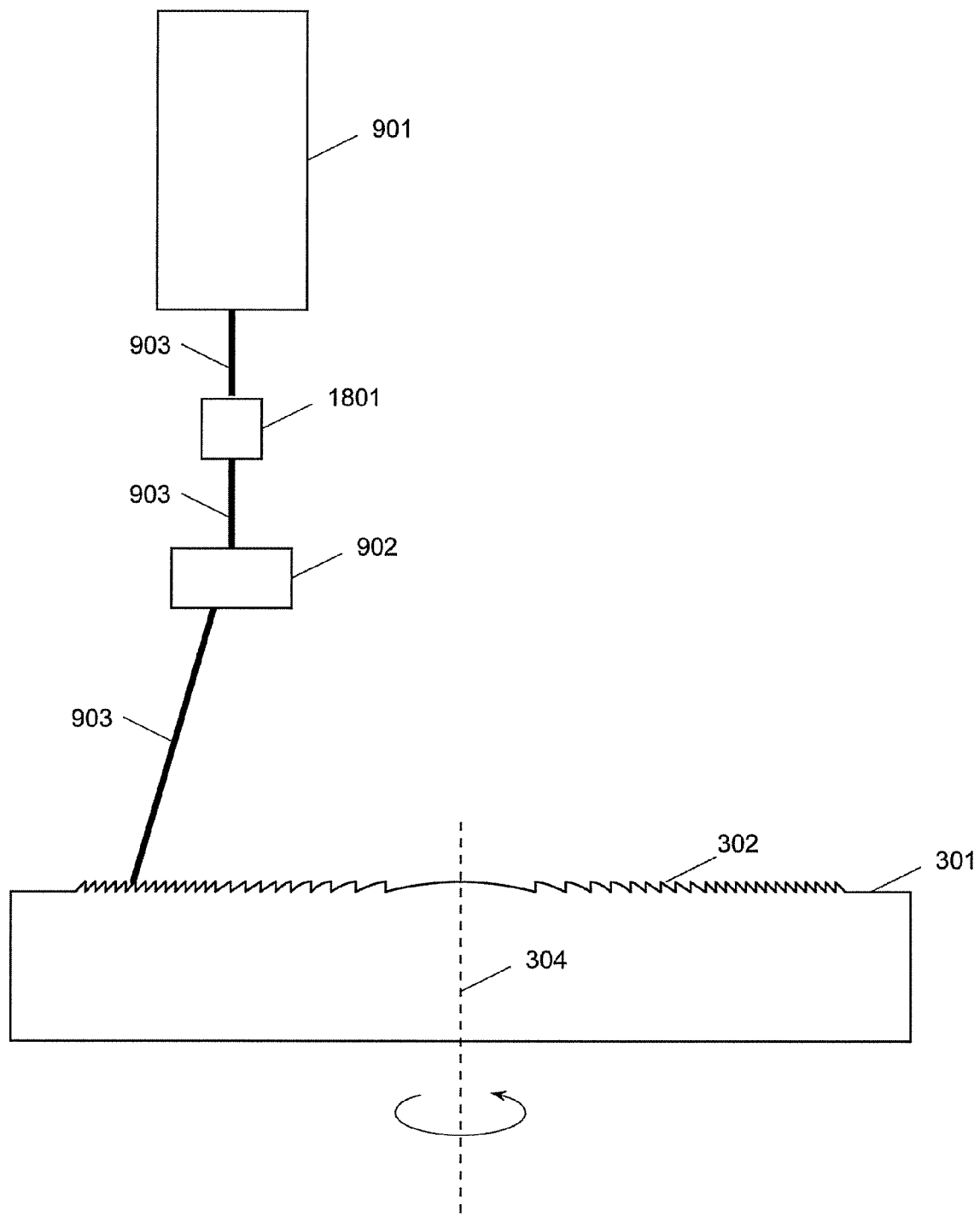
FIG. 18 shows a method of achieving continuous intra-zone alignment using a modified version of the technique shown in FIG. 9 according to embodiments of the present invention.
Figure 19:
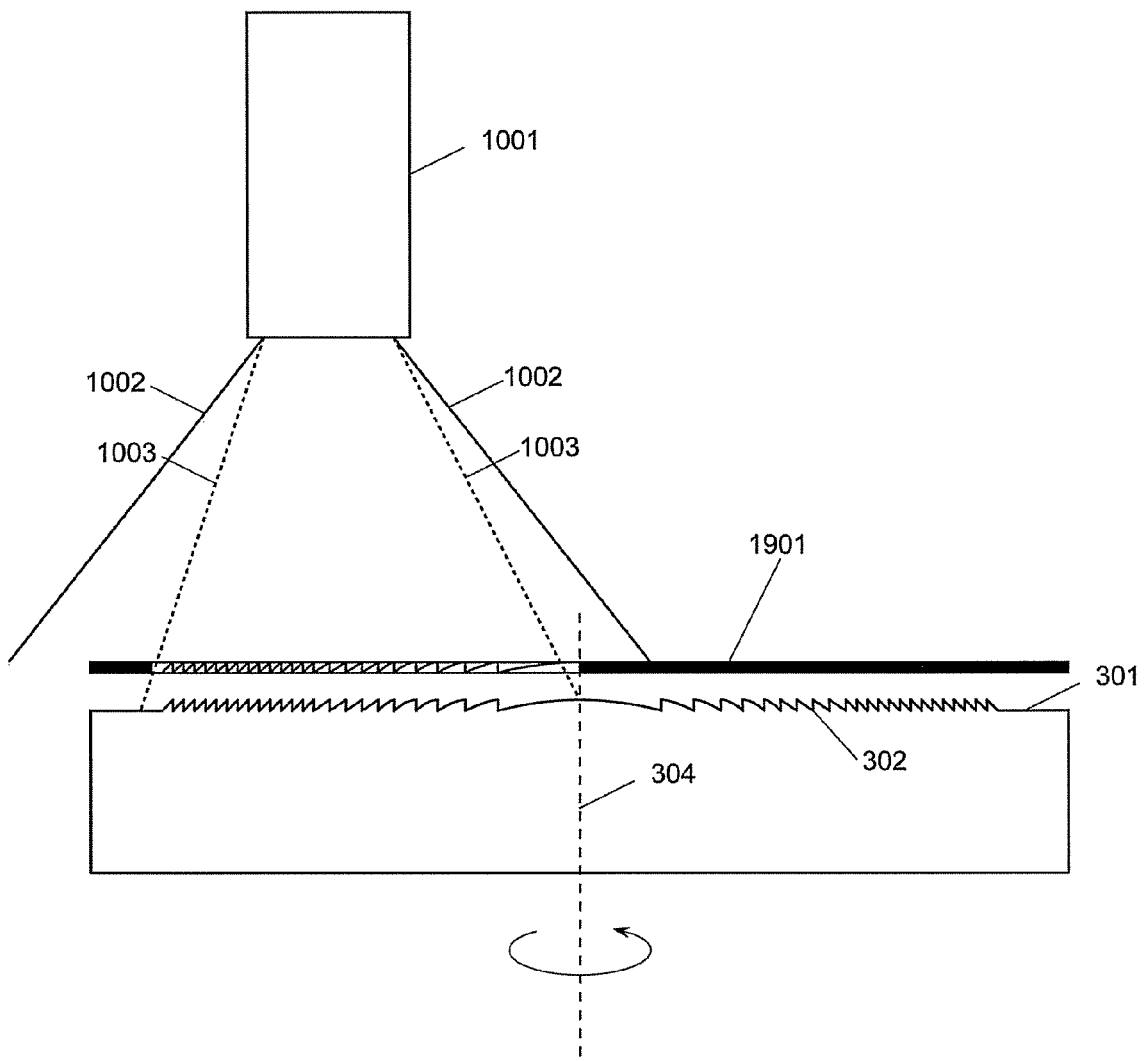
FIG. 19 shows a method of achieving continuous intra-zone alignment using a modified version of the technique shown in FIG. 10 according to embodiments of the present invention.

Achieving continuous intra-zone alignment with UV photosensitive alignment materials may be a more straightforward process. In an embodiment of the present invention the technique shown in FIG. 8 may be used without modification to the physical equipment. The only modification necessary to the technique shown in FIG. 8 may be to the computer code needed to control the polarization state versus position. FIG. 18 shows a method of achieving continuous intra-zone alignment using a modified version of the technique shown in FIG. 9 according to embodiments of the present invention. The technique shown in FIG. 9 may be modified with the addition of polarization controlling optics 1801 and modification to the computer code needed to control the polarization state versus position. Linear polarization-controlling optics 1801 may be an electro-optical modulator such as a Pockels cell, by way of example only. FIG. 19 shows a method of achieving continuous intra-zone alignment using a modified version of the technique shown in FIG. 10 according to embodiments of the present invention. The technique shown in FIG. 10 may be modified by replacing the shadow mask 1004 with a polarization rotation mask 1901 that generates the desired polarization on all points of the substrate. Such a polarization rotation mask may comprise a plate of an optically birefringent material into which a surface relief structure has been introduced. As is well known in the art, varying the thickness of an optically birefringent material will alter the phase change an optical wave experiences when it passes though the material. Such phase changes may be used to rotate the state of polarization. It should be noted that one or more of the substrates in an electro-active element may have a continuous intra-zone alignment.

Achieving oblique or piecewise oblique alignment may be achieved by any of the methods described above for achieving perpendicular, piecewise perpendicular, continuous intra-zone, or piecewise continuous intra-zone alignment (i.e., any method capable of generating alignment with a non-tangential component).

What is claimed is:

1. An electro-active lens, comprising:
   an ophthalmic lens; and
   an electro-active element in optical communication with said ophthalmic lens, comprising:
   a first substrate having a diffractive optical power region; and
   a first alignment layer disposed on a surface of said substrate having a homogeneous
   alignment that is selected from the group consisting of: a tangential alignment, a
   piecewise tangential alignment, a perpendicular alignment, a piecewise perpendicular
   alignment, an oblique alignment, a piecewise oblique alignment, a continuous intra-zone
   alignment, a piecewise continuous intra-zone alignment, and any combination thereof.

2. The electro-active lens of claim 1, wherein said electro-active element comprises:
   a second substrate;
   a second alignment layer disposed on a surface of said second substrate; and
   a liquid crystalline material disposed between said first and said second alignment layers.

3. The electro-active lens of claim 2, wherein said liquid crystalline material is selected from the group consisting of:
   a nematic liquid crystal,
   a cholesteric liquid crystal,
   a smectic liquid crystal, a polymer dispersed liquid crystal, and
   a polymer stabilized liquid crystal.

4. The electro-active lens of claim 2, wherein said electro-active element comprises:
   a first electrode disposed between said first substrate and said first alignment layer;
   a second electrode disposed between said second substrate and said second alignment
   layer; and
   an insulating layer disposed between said first and said second electrodes.

5. The electro-active lens of claim 2, comprising:
a first optical element adhesively attached to said first substrate on a surface of said first substrate opposite said surface having said first alignment layer; and
a second optical element adhesively attached to said second substrate on a surface of said second substrate opposite said surface having said second alignment layer.

6. The electro-active lens of claim 1, wherein said diffractive optical power region comprises diffractive structures.

7. The electro-active lens of claim 1, wherein the direction of said tangential alignment and said piecewise tangential alignment is clockwise.

8. The electro-active lens of claim 1, wherein the direction of said tangential alignment and said piecewise tangential alignment is counterclockwise.

9. The electro-active lens of claim 1, wherein the direction of said perpendicular alignment and said piecewise perpendicular alignment is outward from the center of said diffractive optical power region.

10. The electro-active lens of claim 1, wherein the direction of said perpendicular alignment and said piecewise perpendicular alignment is inward towards the center of said diffractive optical power region.

11. The electro-active lens of claim 1, wherein the electro-active element has a first optical power when activated and a second optical power when deactivated.

12. The electro-active lens of claim 11, wherein said second optical power is substantially zero optical power.

13. The electro-active lens of claim 1, wherein said ophthalmic lens comprises a progressive optical power region, and wherein at least a portion of said electro-active element is in optical communication with said progressive optical power region.

14. An electro-active element, comprising:
a first substrate having a diffractive optical power region; and
a first alignment layer disposed on a surface of said substrate having a homogeneous alignment that is selected from the group consisting of:
a tangential alignment, a piecewise
tangential alignment, a perpendicular alignment, a piecewise perpendicular alignment, an
oblique alignment, a piecewise oblique alignment, a continuous intra-zone alignment, a
piecewise continuous intra-zone alignment, and any combination thereof.

15. The electro-active element of claim 14, comprising:
a second substrate;
a second alignment layer disposed on a surface of said second substrate; and
a liquid crystalline material disposed between said first and said second alignment layers.

16. The electro-active element of claim 15, wherein said liquid crystalline material is selected from the group consisting of:
a nematic liquid crystal,
a cholesteric liquid crystal,
a smectic liquid crystal, a polymer dispersed liquid crystal, and
a polymer stabilized liquid crystal.

17. The electro-active element of claim 15, comprising:
a first electrode disposed between said first substrate and said first alignment layer;
a second electrode disposed between said second substrate and said second alignment layer; and
an insulating layer disposed between said first and said second electrodes.

18. The electro-active element of claim 15, comprising:
a first optical element adhesively attached to said first substrate on a surface of said first substrate opposite said surface having said first alignment layer; and
a second optical element adhesively attached to said second substrate on a surface of said second substrate opposite said surface having said second alignment layer.

* * * * *